US008111566B1

(12) United States Patent  
Wang et al.

(10) Patent No.: US 8,111,566 B1  
(45) Date of Patent: Feb. 7, 2012

(54) OPTIMAL CHANNEL DESIGN FOR MEMORY DEVICES FOR PROVIDING A HIGH-SPEED MEMORY INTERFACE

(75) Inventors: Min Wang, Santa Clara, CA (US); Philip Arnold Ferolito, Sunnyvale, CA (US); Suresh Natarajan Rajan, San Jose, CA (US); Michael John Sebastian Smith, Palo Alto, CA (US)

(73) Assignee: Google, Inc., Mountain View, CA (US)

( * ) Notice: Subject to any disclaimer, the term of this patent is extended or adjusted under 35 U.S.C. 154(b) by 190 days.

(21) Appl. No.: 11/941,589

(22) Filed: Nov. 16, 2007

(51) Int. Cl.
*G11C 7/00* (2006.01)
(52) U.S. Cl. ............ 365/198; 365/191; 365/51; 365/63
(58) Field of Classification Search .................. 365/72, 365/63, 51, 198, 191
See application file for complete search history.

(56) References Cited

U.S. PATENT DOCUMENTS

| | | | |
|---|---|---|---|
| 3,800,292 A | 3/1974 | Curley et al. | |
| 4,069,452 A | 1/1978 | Conway et al. | |
| 4,323,965 A | 4/1982 | Johnson et al. | |
| 4,334,307 A | 6/1982 | Bourgeois et al. | |
| 4,345,319 A | 8/1982 | Bernardini et al. | |
| 4,392,212 A | 7/1983 | Miyasaka et al. | 365/230 |
| 4,525,921 A | 7/1985 | Carson et al. | |
| 4,566,082 A | 1/1986 | Anderson | |
| 4,592,019 A | 5/1986 | Huang et al. | 365/78 |
| 4,646,128 A | 2/1987 | Carson et al. | |
| 4,698,748 A | 10/1987 | Juzswik et al. | 364/200 |
| 4,706,166 A | 11/1987 | Go | |
| 4,710,903 A | 12/1987 | Hereth et al. | 365/194 |
| 4,764,846 A | 8/1988 | Go | |
| 4,780,843 A | 10/1988 | Tietjen | 364/900 |
| 4,794,597 A | 12/1988 | Ooba et al. | |
| 4,796,232 A | 1/1989 | House | 365/189 |
| 4,807,191 A | 2/1989 | Flannagan | |
| 4,841,440 A | 6/1989 | Yonezu et al. | 364/200 |
| 4,862,347 A | 8/1989 | Rudy | |
| 4,884,237 A | 11/1989 | Mueller et al. | |
| 4,887,240 A | 12/1989 | Garverick et al. | 361/222 |
| 4,888,687 A | 12/1989 | Allison et al. | |
| 4,899,107 A | 2/1990 | Corbett et al. | 324/158 |
| 4,912,678 A | 3/1990 | Mashiko | |
| 4,922,451 A | 5/1990 | Lo et al. | |

(Continued)

FOREIGN PATENT DOCUMENTS

DE  102004051345  5/2006

(Continued)

OTHER PUBLICATIONS

Non-final Office Action from U.S. Appl. No. 11/461,430 mailed on Feb. 19, 2009.

(Continued)

*Primary Examiner* — Andrew Q Tran
(74) *Attorney, Agent, or Firm* — Fish & Richardson P.C.

(57) ABSTRACT

A system is provided for high-speed communication between a memory controller and a plurality of memory devices. A memory controller, and a plurality of memory devices are provided. Additionally, at least one channel is included for providing electrical communication between the memory controller and the plurality of memory devices, an impedance of the channel being at least partially controlled using High Density Interconnect (HDI) technology.

9 Claims, 10 Drawing Sheets

U.S. PATENT DOCUMENTS

| | | | |
|---|---|---|---|
| 4,935,734 A | 6/1990 | Austin | 340/825.83 |
| 4,937,791 A | 6/1990 | Steele et al. | |
| 4,956,694 A | 9/1990 | Eide | |
| 4,982,265 A | 1/1991 | Watanabe et al. | |
| 4,983,533 A | 1/1991 | Go | |
| 5,025,364 A | 6/1991 | Zellmer | |
| 5,072,424 A | 12/1991 | Brent et al. | 365/189 |
| 5,083,266 A | 1/1992 | Watanabe | 395/275 |
| 5,104,820 A | 4/1992 | Go et al. | |
| 5,193,072 A | 3/1993 | Frenkil et al. | |
| 5,220,672 A | 6/1993 | Nakao et al. | 395/750 |
| 5,241,266 A | 8/1993 | Ahmad et al. | 324/158 |
| 5,252,807 A | 10/1993 | Chizinsky | 219/390 |
| 5,257,233 A | 10/1993 | Schaefer | 365/227 |
| 5,278,796 A | 1/1994 | Tillinghast et al. | 365/211 |
| 5,282,177 A | 1/1994 | McLaury | 365/230 |
| 5,332,922 A | 7/1994 | Oguchi et al. | 257/723 |
| 5,347,428 A | 9/1994 | Carson et al. | |
| 5,384,745 A | 1/1995 | Konishi et al. | 365/230.03 |
| 5,388,265 A | 2/1995 | Volk | 395/750 |
| 5,390,334 A | 2/1995 | Harrison | |
| 5,408,190 A | 4/1995 | Wood et al. | 324/765 |
| 5,432,729 A | 7/1995 | Carson et al. | |
| 5,448,511 A | 9/1995 | Paurus et al. | |
| 5,453,434 A | 9/1995 | Albaugh et al. | 514/397 |
| 5,467,455 A | 11/1995 | Gay et al. | 395/281 |
| 5,483,497 A | 1/1996 | Mochizuki et al. | |
| 5,498,886 A | 3/1996 | Hsu et al. | 257/213 |
| 5,502,333 A | 3/1996 | Bertin et al. | |
| 5,502,667 A | 3/1996 | Bertin et al. | |
| 5,513,135 A | 4/1996 | Dell et al. | |
| 5,513,339 A | 4/1996 | Agrawal et al. | |
| 5,519,832 A | 5/1996 | Warchol | |
| 5,526,320 A | 6/1996 | Zagar et al. | 365/233 |
| 5,530,836 A | 6/1996 | Busch et al. | 395/477 |
| 5,550,781 A | 8/1996 | Sugawara et al. | |
| 5,559,990 A | 9/1996 | Cheng et al. | 395/484 |
| 5,561,622 A | 10/1996 | Bertin et al. | |
| 5,563,086 A | 10/1996 | Bertin et al. | |
| 5,566,344 A | 10/1996 | Hall et al. | 395/800 |
| 5,581,498 A | 12/1996 | Ludwig et al. | |
| 5,581,779 A | 12/1996 | Hall et al. | 395/800 |
| 5,590,071 A | 12/1996 | Kolor et al. | 365/149 |
| 5,598,376 A | 1/1997 | Merritt et al. | 365/230 |
| 5,604,714 A | 2/1997 | Manning et al. | 365/230 |
| 5,606,710 A | 2/1997 | Hall et al. | 395/800 |
| 5,608,262 A | 3/1997 | Degani et al. | |
| 5,610,864 A | 3/1997 | Manning | 365/193 |
| 5,623,686 A | 4/1997 | Hall et al. | 395/800 |
| 5,627,791 A | 5/1997 | Wright et al. | 365/222 |
| 5,640,337 A | 6/1997 | Huang et al. | 364/578 |
| 5,640,364 A | 6/1997 | Merritt et al. | 365/233 |
| 5,652,724 A | 7/1997 | Manning | 365/189 |
| 5,654,204 A | 8/1997 | Anderson | 438/15 |
| 5,661,677 A | 8/1997 | Rondeau et al. | 365/63 |
| 5,661,695 A | 8/1997 | Zagar et al. | 365/233 |
| 5,668,773 A | 9/1997 | Zagar et al. | 365/233 |
| 5,675,549 A | 10/1997 | Ong et al. | 365/233 |
| 5,680,342 A | 10/1997 | Frankeny | |
| 5,682,354 A | 10/1997 | Manning | 365/233 |
| 5,692,121 A | 11/1997 | Bozso et al. | |
| 5,692,202 A | 11/1997 | Kardach et al. | 395/750 |
| 5,696,732 A | 12/1997 | Zagar et al. | 365/233 |
| 5,702,984 A | 12/1997 | Bertin et al. | |
| 5,703,813 A | 12/1997 | Manning et al. | 365/189 |
| 5,706,247 A | 1/1998 | Merritt et al. | 365/233 |
| RE35,733 E | 2/1998 | Hernandez et al. | |
| 5,717,654 A | 2/1998 | Manning | 365/233 |
| 5,721,859 A | 2/1998 | Manning | 397/421 |
| 5,724,288 A | 3/1998 | Cloud et al. | 365/193 |
| 5,729,503 A | 3/1998 | Manning | 365/233 |
| 5,729,504 A | 3/1998 | Cowles | 365/236 |
| 5,742,792 A | 4/1998 | Yanai et al. | |
| 5,748,914 A | 5/1998 | Barth et al. | 395/285 |
| 5,752,045 A | 5/1998 | Chen | 395/750 |
| 5,757,703 A | 5/1998 | Merritt et al. | 365/189 |
| 5,760,478 A | 6/1998 | Bozso et al. | |
| 5,761,703 A | 6/1998 | Bolyn | 711/106 |
| 5,781,766 A | 7/1998 | Davis | 395/552 |
| 5,787,457 A | 7/1998 | Miller et al. | |
| 5,798,961 A | 8/1998 | Heyden et al. | 365/52 |
| 5,802,010 A | 9/1998 | Zagar et al. | 365/233 |
| 5,802,395 A | 9/1998 | Connolly et al. | |
| 5,802,555 A | 9/1998 | Shigeeda | 711/106 |
| 5,812,488 A | 9/1998 | Zagar et al. | 365/233 |
| 5,819,065 A | 10/1998 | Chilton et al. | |
| 5,831,833 A | 11/1998 | Shirakawa et al. | |
| 5,831,931 A | 11/1998 | Manning | 365/233 |
| 5,831,932 A | 11/1998 | Merritt et al. | 365/233 |
| 5,834,838 A | 11/1998 | Anderson | 257/697 |
| 5,835,435 A | 11/1998 | Bogin et al. | 365/22 |
| 5,838,165 A | 11/1998 | Chatter | |
| 5,838,177 A | 11/1998 | Keeth | 327/108 |
| 5,841,580 A | 11/1998 | Farmwald et al. | 365/194 |
| 5,843,799 A | 12/1998 | Hsu et al. | 438/6 |
| 5,843,807 A | 12/1998 | Burns | |
| 5,845,108 A | 12/1998 | Yoo et al. | 395/551 |
| 5,850,368 A | 12/1998 | Ong et al. | 365/238 |
| 5,859,792 A | 1/1999 | Rondeau et al. | 365/52 |
| 5,860,106 A | 1/1999 | Domen et al. | 711/137 |
| 5,870,347 A | 2/1999 | Keeth et al. | 365/230 |
| 5,870,350 A | 2/1999 | Bertin | |
| 5,872,907 A | 2/1999 | Griess et al. | |
| 5,875,142 A | 2/1999 | Chevallier | 365/212 |
| 5,878,279 A | 3/1999 | Athenes | |
| 5,884,088 A | 3/1999 | Kardach et al. | 395/750.06 |
| 5,901,105 A | 5/1999 | Ong et al. | 365/230.06 |
| 5,903,500 A | 5/1999 | Tsang et al. | 365/189.05 |
| 5,905,688 A | 5/1999 | Park | 365/227 |
| 5,907,512 A | 5/1999 | Parkinson et al. | 365/195 |
| 5,913,072 A | 6/1999 | Wieringa | |
| 5,915,105 A | 6/1999 | Farmwald et al. | 395/309 |
| 5,915,167 A | 6/1999 | Leedy | |
| 5,917,758 A | 6/1999 | Keeth | 365/189.05 |
| 5,923,611 A | 7/1999 | Ryan | 365/233 |
| 5,924,111 A | 7/1999 | Huang et al. | |
| 5,926,435 A | 7/1999 | Park et al. | |
| 5,929,650 A | 7/1999 | Pappert et al. | 324/763 |
| 5,943,254 A | 8/1999 | Bakeman, Jr. et al. | |
| 5,946,265 A | 8/1999 | Cowles | 365/233 |
| 5,949,254 A | 9/1999 | Keeth | 326/87 |
| 5,953,215 A | 9/1999 | Karabatsos | |
| 5,953,263 A | 9/1999 | Farmwald et al. | 365/194 |
| 5,954,804 A | 9/1999 | Farmwald et al. | 710/36 |
| 5,956,233 A | 9/1999 | Yew et al. | |
| 5,962,435 A | 10/1999 | Mao et al. | 514/63 |
| 5,963,429 A | 10/1999 | Chen | |
| 5,963,463 A | 10/1999 | Rondeau et al. | 365/52 |
| 5,963,464 A | 10/1999 | Dell et al. | |
| 5,963,504 A | 10/1999 | Manning | 365/233 |
| 5,966,724 A | 10/1999 | Ryan | 711/105 |
| 5,966,727 A | 10/1999 | Nishino | 711/127 |
| 5,969,996 A | 10/1999 | Muranaka et al. | 365/189 |
| 5,973,392 A | 10/1999 | Senba et al. | |
| 5,995,424 A | 11/1999 | Lawrence et al. | |
| 5,995,443 A | 11/1999 | Farmwald et al. | 365/233 |
| 6,001,671 A | 12/1999 | Fjelstad | |
| 6,002,613 A | 12/1999 | Cloud et al. | 365/189 |
| 6,002,627 A | 12/1999 | Chevallier | 365/212 |
| 6,014,339 A | 1/2000 | Kobayashi et al. | 365/233 |
| 6,016,282 A | 1/2000 | Keeth | 365/233 |
| 6,026,050 A | 2/2000 | Baker et al. | 365/233 |
| 6,029,250 A | 2/2000 | Keeth | 713/400 |
| 6,032,214 A | 2/2000 | Farmwald et al. | 710/129 |
| 6,032,215 A | 2/2000 | Farmwald et al. | 710/129 |
| 6,034,916 A | 3/2000 | Lee | 365/233 |
| 6,034,918 A | 3/2000 | Farmwald et al. | 365/233 |
| 6,035,365 A | 3/2000 | Farmwald et al. | 710/129 |
| 6,038,195 A | 3/2000 | Farmwald et al. | 365/233 |
| 6,038,673 A | 3/2000 | Benn et al. | 713/323 |
| 6,044,032 A | 3/2000 | Li | 365/230 |
| 6,047,073 A | 4/2000 | Norris et al. | |
| 6,047,344 A | 4/2000 | Kawasumi et al. | 710/107 |
| 6,053,948 A | 4/2000 | Vaidyanathan et al. | 703/14 |
| 6,058,451 A | 5/2000 | Bermingham et al. | |
| 6,069,504 A | 5/2000 | Keeth | 327/108 |
| 6,070,217 A | 5/2000 | Connolly et al. | |

| Patent No. | Date | Inventor | Class |
|---|---|---|---|
| 6,073,223 A | 6/2000 | McAllister et al. | 711/167 |
| 6,075,730 A | 6/2000 | Barth et al. | 365/191 |
| 6,075,744 A | 6/2000 | Tsern et al. | 365/230 |
| 6,078,546 A | 6/2000 | Lee | 365/233 |
| 6,079,025 A | 6/2000 | Fung | 713/323 |
| 6,084,434 A | 7/2000 | Keeth | 326/87 |
| 6,088,290 A | 7/2000 | Ohtake et al. | 365/233 |
| 6,091,251 A | 7/2000 | Wood et al. | 324/755 |
| RE36,839 E | 8/2000 | Simmons et al. | 326/93 |
| 6,101,152 A | 8/2000 | Farmwald et al. | 365/233 |
| 6,101,564 A | 8/2000 | Athenes et al. | |
| 6,101,612 A | 8/2000 | Jeddeloh | 713/401 |
| 6,108,795 A | 8/2000 | Jeddeloh | 713/401 |
| 6,111,812 A | 8/2000 | Gans et al. | 365/233 |
| 6,134,638 A | 10/2000 | Olarig et al. | 711/167 |
| 6,154,370 A | 11/2000 | Degani et al. | |
| 6,166,991 A | 12/2000 | Phelan | 365/233 |
| 6,182,184 B1 | 1/2001 | Farmwald et al. | 710/129 |
| 6,199,151 B1 | 3/2001 | Williams et al. | |
| 6,208,168 B1 | 3/2001 | Rhee | 326/83 |
| 6,216,246 B1 | 4/2001 | Shau | 714/763 |
| 6,222,739 B1 | 4/2001 | Bhakta et al. | |
| 6,226,709 B1 | 5/2001 | Goodwin et al. | |
| 6,233,192 B1 | 5/2001 | Tanaka | |
| 6,233,650 B1 | 5/2001 | Johnson et al. | |
| 6,240,048 B1 | 5/2001 | Matsubara | 365/233 |
| 6,243,282 B1 | 6/2001 | Rondeau et al. | 365/52 |
| 6,252,807 B1 | 6/2001 | Suzuki et al. | |
| 6,260,097 B1 | 7/2001 | Farmwald et al. | 710/129 |
| 6,260,154 B1 | 7/2001 | Jeddeloh | 713/401 |
| 6,262,938 B1 | 7/2001 | Lee et al. | 365/233 |
| 6,266,285 B1 | 7/2001 | Farmwald et al. | 365/194 |
| 6,266,292 B1 | 7/2001 | Tsern et al. | 365/230 |
| 6,274,395 B1 | 8/2001 | Weber | 438/14 |
| 6,279,069 B1 | 8/2001 | Robinson et al. | 711/103 |
| 6,295,572 B1 | 9/2001 | Wu | 710/131 |
| 6,298,426 B1 | 10/2001 | Ajanovic | 711/172 |
| 6,304,511 B1 | 10/2001 | Gans et al. | 365/233 |
| 6,307,769 B1 | 10/2001 | Nuxoll et al. | 365/63 |
| 6,314,051 B1 | 11/2001 | Farmwald et al. | 365/233 |
| 6,317,352 B1 | 11/2001 | Halbert et al. | 365/52 |
| 6,317,381 B1 | 11/2001 | Gans et al. | 365/233 |
| 6,324,120 B2 | 11/2001 | Farmwald et al. | 365/233 |
| 6,326,810 B1 | 12/2001 | Keeth | 326/83 |
| 6,327,664 B1 | 12/2001 | Dell et al. | 713/323 |
| 6,330,683 B1 | 12/2001 | Jeddeloh | 713/401 |
| 6,336,174 B1 | 1/2002 | Li et al. | |
| 6,338,108 B1 | 1/2002 | Motomura | 710/110 |
| 6,338,113 B1 | 1/2002 | Kubo et al. | 711/105 |
| 6,341,347 B1 | 1/2002 | Joy et al. | 712/228 |
| 6,343,019 B1 | 1/2002 | Jiang et al. | |
| 6,343,042 B1 | 1/2002 | Tsern et al. | 365/222 |
| 6,353,561 B1 | 3/2002 | Funyu et al. | 365/195 |
| 6,356,105 B1 | 3/2002 | Volk | 326/30 |
| 6,356,500 B1 | 3/2002 | Cloud et al. | 365/226 |
| 6,362,656 B2 | 3/2002 | Rhee | 326/87 |
| 6,363,031 B2 | 3/2002 | Phelan | 365/233 |
| 6,378,020 B2 | 4/2002 | Farmwald et al. | 710/129 |
| 6,381,188 B1 | 4/2002 | Choi et al. | 365/222 |
| 6,381,668 B1 | 4/2002 | Lunteren | 711/5 |
| 6,389,514 B1 | 5/2002 | Rokicki | |
| 6,392,304 B1 | 5/2002 | Butler | |
| 6,414,868 B1 | 7/2002 | Wong et al. | 365/51 |
| 6,418,034 B1 | 7/2002 | Weber et al. | |
| 6,421,754 B1 | 7/2002 | Kau et al. | |
| 6,424,532 B2 | 7/2002 | Kawamura | |
| 6,426,916 B2 | 7/2002 | Farmwald et al. | 365/233 |
| 6,429,029 B1 | 8/2002 | Eldridge et al. | 438/14 |
| 6,430,103 B2 | 8/2002 | Nakayama et al. | 365/230.03 |
| 6,437,600 B1 | 8/2002 | Keeth | 326/86 |
| 6,438,057 B1 | 8/2002 | Ruckerbauer | 365/222 |
| 6,442,698 B2 | 8/2002 | Nizar | 713/320 |
| 6,445,591 B1 | 9/2002 | Kwong | |
| 6,452,826 B1 | 9/2002 | Kim et al. | |
| 6,452,863 B2 | 9/2002 | Farmwald et al. | 365/233 |
| 6,453,400 B1 | 9/2002 | Maesako et al. | 711/167 |
| 6,453,402 B1 | 9/2002 | Jeddeloh | 711/167 |
| 6,453,434 B2 | 9/2002 | Delp et al. | |
| 6,455,348 B1 | 9/2002 | Yamaguchi | |
| 6,457,095 B1 | 9/2002 | Volk | 711/105 |
| 6,459,651 B1 | 10/2002 | Lee et al. | 365/233 |
| 6,473,831 B1 | 10/2002 | Schade | 711/115 |
| 6,476,476 B1 | 11/2002 | Glenn | |
| 6,480,929 B1 | 11/2002 | Gauthier et al. | 711/105 |
| 6,487,102 B1 | 11/2002 | Halbert et al. | |
| 6,489,669 B2 | 12/2002 | Shimada et al. | |
| 6,490,161 B1 | 12/2002 | Johnson | |
| 6,492,726 B1 | 12/2002 | Quek et al. | |
| 6,493,789 B2 | 12/2002 | Ware et al. | 711/105 |
| 6,496,440 B2 | 12/2002 | Manning | 365/230.03 |
| 6,496,897 B2 | 12/2002 | Ware et al. | 711/105 |
| 6,498,766 B2 | 12/2002 | Lee et al. | 365/233 |
| 6,510,097 B2 | 1/2003 | Fukuyama | 365/230.03 |
| 6,510,503 B2 | 1/2003 | Gillingham et al. | 711/167 |
| 6,512,392 B2 | 1/2003 | Fleury et al. | 324/765 |
| 6,521,984 B2 | 2/2003 | Matsuura | |
| 6,526,471 B1 | 2/2003 | Shimomura et al. | 711/5 |
| 6,526,473 B1 | 2/2003 | Kim | |
| 6,526,484 B1 | 2/2003 | Stacovsky et al. | 711/158 |
| 6,545,895 B1 | 4/2003 | Li et al. | |
| 6,546,446 B2 | 4/2003 | Farmwald et al. | 710/305 |
| 6,553,450 B1 | 4/2003 | Dodd et al. | 711/105 |
| 6,560,158 B2 | 5/2003 | Choi et al. | 365/226 |
| 6,563,337 B2 | 5/2003 | Dour | 326/30 |
| 6,563,759 B2 | 5/2003 | Yahata et al. | 365/233 |
| 6,564,281 B2 | 5/2003 | Farmwald et al. | 710/305 |
| 6,564,285 B1 | 5/2003 | Mills et al. | 711/103 |
| 6,574,150 B2 | 6/2003 | Suyama et al. | 365/189.05 |
| 6,584,037 B2 | 6/2003 | Farmwald et al. | 365/233 |
| 6,587,912 B2 | 7/2003 | Leddige et al. | 711/5 |
| 6,590,822 B2 | 7/2003 | Hwang et al. | 365/222 |
| 6,594,770 B1 | 7/2003 | Sato et al. | 713/320 |
| 6,597,616 B2 | 7/2003 | Tsern et al. | 365/222 |
| 6,597,617 B2 | 7/2003 | Ooishi et al. | |
| 6,614,700 B2 | 9/2003 | Dietrich et al. | 365/194 |
| 6,618,267 B1 | 9/2003 | Dalal et al. | |
| 6,618,791 B1 | 9/2003 | Dodd et al. | 711/105 |
| 6,621,760 B1 | 9/2003 | Ahmad et al. | 365/233 |
| 6,630,729 B2 | 10/2003 | Huang | |
| 6,631,086 B1 | 10/2003 | Bill et al. | 365/185.09 |
| 6,639,820 B1 | 10/2003 | Khandekar et al. | |
| 6,646,939 B2 | 11/2003 | Kwak | |
| 6,650,588 B2 | 11/2003 | Yamagata | 365/222 |
| 6,650,594 B1 | 11/2003 | Lee et al. | 365/233 |
| 6,657,634 B1 | 12/2003 | Sinclair et al. | |
| 6,657,918 B2 | 12/2003 | Foss et al. | 365/233 |
| 6,657,919 B2 | 12/2003 | Foss et al. | 365/233 |
| 6,658,016 B1 | 12/2003 | Dai et al. | |
| 6,658,530 B1 | 12/2003 | Robertson et al. | 711/115 |
| 6,659,512 B1 | 12/2003 | Harper et al. | |
| 6,664,625 B2 | 12/2003 | Hiruma | |
| 6,665,224 B1 | 12/2003 | Lehmann et al. | 365/222 |
| 6,665,227 B2 | 12/2003 | Fetzer | 365/229 |
| 6,668,242 B1 | 12/2003 | Reynov et al. | |
| 6,674,154 B2 | 1/2004 | Minamio et al. | |
| 6,683,372 B1 | 1/2004 | Wong et al. | |
| 6,684,292 B2 | 1/2004 | Piccirillo et al. | |
| 6,690,191 B2 | 2/2004 | Wu et al. | |
| 6,697,295 B2 | 2/2004 | Farmwald et al. | 365/233 |
| 6,701,446 B2 | 3/2004 | Tsern et al. | 713/501 |
| 6,705,877 B1 | 3/2004 | Li et al. | |
| 6,708,144 B1 | 3/2004 | Merryman et al. | 703/14 |
| 6,710,430 B2 | 3/2004 | Minamio et al. | |
| 6,711,043 B2 | 3/2004 | Friedman et al. | |
| 6,713,856 B2 | 3/2004 | Tsai et al. | |
| 6,714,891 B2 | 3/2004 | Dendinger | 702/132 |
| 6,724,684 B2 | 4/2004 | Kim | 365/233 |
| 6,730,540 B2 | 5/2004 | Siniaguine | |
| 6,731,009 B1 | 5/2004 | Jones et al. | |
| 6,731,527 B2 | 5/2004 | Brown | 365/63 |
| 6,742,098 B1 | 5/2004 | Halbert et al. | |
| 6,744,687 B2 | 6/2004 | Koo et al. | 365/226 |
| 6,747,887 B2 | 6/2004 | Halbert et al. | |
| 6,751,113 B2 | 6/2004 | Bhakta et al. | |
| 6,751,696 B2 | 6/2004 | Farmwald et al. | 710/305 |
| 6,754,129 B2 | 6/2004 | Khateri et al. | 365/226 |
| 6,754,132 B2 | 6/2004 | Kyung | 365/233 |
| 6,757,751 B1 | 6/2004 | Gene | |

| Patent | Kind | Date | Inventor | Class |
|---|---|---|---|---|
| 6,762,948 | B2 | 7/2004 | Kyun et al. | 365/51 |
| 6,765,812 | B2 | 7/2004 | Anderson | |
| 6,766,469 | B2 | 7/2004 | Larson et al. | |
| 6,771,526 | B2 | 8/2004 | LaBerge | |
| 6,772,359 | B2 | 8/2004 | Kwak et al. | |
| 6,779,097 | B2 | 8/2004 | Gillingham et al. | 711/167 |
| 6,785,767 | B2 | 8/2004 | Coulson | 711/112 |
| 6,791,877 | B2 | 9/2004 | Miura et al. | 365/185 |
| 6,795,899 | B2 | 9/2004 | Dodd et al. | 711/137 |
| 6,799,241 | B2 | 9/2004 | Kahn et al. | 711/105 |
| 6,801,989 | B2 | 10/2004 | Johnson et al. | 711/167 |
| 6,807,598 | B2 | 10/2004 | Farmwald et al. | 710/305 |
| 6,807,655 | B1 | 10/2004 | Rehani et al. | 716/4 |
| 6,816,991 | B2 | 11/2004 | Sanghani | 714/733 |
| 6,819,602 | B2 | 11/2004 | Seo et al. | 365/193 |
| 6,819,617 | B2 | 11/2004 | Hwang et al. | 365/222 |
| 6,820,163 | B1 | 11/2004 | McCall et al. | 710/310 |
| 6,820,169 | B2 | 11/2004 | Wilcox et al. | 711/105 |
| 6,826,104 | B2 | 11/2004 | Kawaguchi et al. | 365/222 |
| 6,839,290 | B2 | 1/2005 | Ahmad et al. | 365/193 |
| 6,845,027 | B2 | 1/2005 | Mayer et al. | |
| 6,845,055 | B1 | 1/2005 | Koga et al. | 365/229 |
| 6,847,582 | B2 | 1/2005 | Pan | 365/233 |
| 6,850,449 | B2 | 2/2005 | Takahashi | 365/222 |
| 6,862,202 | B2 | 3/2005 | Schaefer | |
| 6,862,249 | B2 | 3/2005 | Kyung | 365/233 |
| 6,862,653 | B1 | 3/2005 | Dodd et al. | 711/105 |
| 6,873,534 | B2 | 3/2005 | Bhakta et al. | |
| 6,878,570 | B2 | 4/2005 | Lyu et al. | |
| 6,894,933 | B2 | 5/2005 | Kuzmenka et al. | 365/189.05 |
| 6,898,683 | B2 | 5/2005 | Nakamura | 711/167 |
| 6,908,314 | B2 | 6/2005 | Brown | 439/68 |
| 6,912,778 | B2 | 7/2005 | Ahn et al. | 29/852 |
| 6,914,786 | B1 | 7/2005 | Paulsen et al. | |
| 6,917,219 | B2 | 7/2005 | New | 326/41 |
| 6,922,371 | B2 | 7/2005 | Takahashi et al. | 365/227 |
| 6,930,900 | B2 | 8/2005 | Bhakta et al. | |
| 6,930,903 | B2 | 8/2005 | Bhakta et al. | |
| 6,938,119 | B2 | 8/2005 | Kohn et al. | 711/105 |
| 6,943,450 | B2 | 9/2005 | Fee et al. | |
| 6,944,748 | B2 | 9/2005 | Sanches et al. | |
| 6,947,341 | B2 | 9/2005 | Stubbs et al. | |
| 6,951,982 | B2 | 10/2005 | Chye et al. | |
| 6,952,794 | B2 | 10/2005 | Lu | |
| 6,961,281 | B2 | 11/2005 | Wong et al. | 365/230.03 |
| 6,968,416 | B2 | 11/2005 | Moy | 710/310 |
| 6,968,419 | B1 | 11/2005 | Holman | 711/5 |
| 6,970,968 | B1 | 11/2005 | Holman | 711/5 |
| 6,980,021 | B1 | 12/2005 | Srivastava et al. | 326/30 |
| 6,986,118 | B2 | 1/2006 | Dickman | 716/8 |
| 6,992,501 | B2 | 1/2006 | Rapport | |
| 6,992,950 | B2 | 1/2006 | Foss et al. | 365/233 |
| 7,000,062 | B2 | 2/2006 | Perego et al. | 711/5 |
| 7,003,618 | B2 | 2/2006 | Perego et al. | 711/5 |
| 7,003,639 | B2 | 2/2006 | Tsern et al. | 711/154 |
| 7,007,095 | B2 | 2/2006 | Chen et al. | |
| 7,007,175 | B2 | 2/2006 | Chang et al. | 713/300 |
| 7,010,642 | B2 | 3/2006 | Perego et al. | 711/5 |
| 7,010,736 | B1 | 3/2006 | Teh et al. | 714/733 |
| 7,024,518 | B2 | 4/2006 | Halbert et al. | 711/115 |
| 7,026,708 | B2 | 4/2006 | Cady et al. | |
| 7,028,215 | B2 | 4/2006 | Depew et al. | |
| 7,028,234 | B2 | 4/2006 | Huckaby et al. | 714/710 |
| 7,033,861 | B1 | 4/2006 | Partridge et al. | |
| 7,035,150 | B2 | 4/2006 | Streif et al. | 365/194 |
| 7,043,599 | B1 | 5/2006 | Ware et al. | 711/106 |
| 7,043,611 | B2 | 5/2006 | McClannahan et al. | |
| 7,045,396 | B2 | 5/2006 | Crowley et al. | |
| 7,045,901 | B2 | 5/2006 | Lin et al. | |
| 7,046,538 | B2 | 5/2006 | Kinsley et al. | |
| 7,053,470 | B1 | 5/2006 | Sellers et al. | |
| 7,053,478 | B2 | 5/2006 | Roper et al. | |
| 7,058,776 | B2 | 6/2006 | Lee | 711/167 |
| 7,058,863 | B2 | 6/2006 | Kouchi et al. | 714/718 |
| 7,061,784 | B2 | 6/2006 | Jakobs et al. | |
| 7,061,823 | B2 | 6/2006 | Faue et al. | 365/230.08 |
| 7,066,741 | B2 | 6/2006 | Burns et al. | |
| 7,075,175 | B2 | 7/2006 | Kazi et al. | 257/678 |
| 7,079,396 | B2 | 7/2006 | Gates et al. | |
| 7,079,441 | B1 | 7/2006 | Partsch et al. | 365/226 |
| 7,079,446 | B2 | 7/2006 | Murtagh et al. | 365/233 |
| 7,085,152 | B2 | 8/2006 | Ellis et al. | 365/149 |
| 7,085,941 | B2 | 8/2006 | Li | 713/300 |
| 7,089,438 | B2 | 8/2006 | Raad | 713/322 |
| 7,093,101 | B2 | 8/2006 | Aasheim et al. | 711/207 |
| 7,103,730 | B2 | 9/2006 | Saxena et al. | 711/156 |
| 7,119,428 | B2 | 10/2006 | Tanie et al. | |
| 7,120,727 | B2 | 10/2006 | Lee et al. | 711/5 |
| 7,126,399 | B1 | 10/2006 | Lee | 327/261 |
| 7,127,567 | B2 | 10/2006 | Ramakrishnan et al. | |
| 7,133,960 | B1 | 11/2006 | Thompson et al. | 711/5 |
| 7,136,978 | B2 | 11/2006 | Miura et al. | 711/165 |
| 7,149,145 | B2 | 12/2006 | Kim et al. | 365/233 |
| 7,149,824 | B2 | 12/2006 | Johnson | 710/35 |
| 7,173,863 | B2 | 2/2007 | Conley et al. | 365/189 |
| 7,200,021 | B2 | 4/2007 | Raghuram | 365/51 |
| 7,205,789 | B1 | 4/2007 | Karabatsos | 326/30 |
| 7,210,059 | B2 | 4/2007 | Jeddeloh | |
| 7,215,561 | B2 | 5/2007 | Park et al. | |
| 7,218,566 | B1 | 5/2007 | Totolos, Jr. et al. | |
| 7,224,595 | B2 | 5/2007 | Dreps et al. | 365/63 |
| 7,228,264 | B2 | 6/2007 | Barrenscheen et al. | 703/23 |
| 7,231,562 | B2 | 6/2007 | Ohlhoff et al. | |
| 7,233,541 | B2 | 6/2007 | Yamamoto et al. | 365/230.03 |
| 7,234,081 | B2 | 6/2007 | Nguyen et al. | |
| 7,243,185 | B2 | 7/2007 | See et al. | |
| 7,245,541 | B2 | 7/2007 | Janzen | 365/198 |
| 7,254,036 | B2 | 8/2007 | Pauley et al. | 361/721 |
| 7,266,639 | B2 | 9/2007 | Raghuram | 711/115 |
| 7,269,042 | B2 | 9/2007 | Kinsley et al. | 365/52 |
| 7,269,708 | B2 | 9/2007 | Ware | 711/203 |
| 7,274,583 | B2 * | 9/2007 | Park et al. | 365/63 |
| 7,277,333 | B2 | 10/2007 | Schaefer | |
| 7,286,436 | B2 | 10/2007 | Bhakta et al. | 365/230 |
| 7,289,386 | B2 | 10/2007 | Bhakta et al. | 365/230 |
| 7,296,754 | B2 | 11/2007 | Nishizawa et al. | 235/492 |
| 7,299,330 | B2 | 11/2007 | Gillingham et al. | 711/167 |
| 7,302,598 | B2 | 11/2007 | Suzuki et al. | |
| 7,307,863 | B2 | 12/2007 | Yen et al. | 365/63 |
| 7,317,250 | B2 | 1/2008 | Koh et al. | |
| 7,363,422 | B2 | 4/2008 | Perego et al. | 711/105 |
| 7,366,947 | B2 | 4/2008 | Gower et al. | |
| 7,379,316 | B2 | 5/2008 | Rajan | 365/63 |
| 7,386,656 | B2 | 6/2008 | Rajan et al. | 711/103 |
| 7,392,338 | B2 | 6/2008 | Rajan et al. | 711/103 |
| 7,408,393 | B1 | 8/2008 | Jain et al. | 327/202 |
| 7,409,492 | B2 | 8/2008 | Tanaka et al. | 711/103 |
| 7,414,917 | B2 | 8/2008 | Ruckerbauer et al. | |
| 7,428,644 | B2 | 9/2008 | Jeddeloh et al. | |
| 7,437,579 | B2 | 10/2008 | Jeddeloh et al. | 713/300 |
| 7,441,064 | B2 | 10/2008 | Gaskins | |
| 7,457,122 | B2 | 11/2008 | Lai et al. | |
| 7,464,225 | B2 | 12/2008 | Tsern | 711/115 |
| 7,472,220 | B2 | 12/2008 | Rajan et al. | 711/103 |
| 7,474,576 | B2 | 1/2009 | Co et al. | |
| 7,480,147 | B2 | 1/2009 | Hoss et al. | |
| 7,480,774 | B2 | 1/2009 | Ellis et al. | |
| 7,496,777 | B2 | 2/2009 | Kapil | 713/324 |
| 7,515,453 | B2 | 4/2009 | Rajan | 365/63 |
| 7,532,537 | B2 | 5/2009 | Solomon et al. | 365/230 |
| 7,539,800 | B2 | 5/2009 | Dell et al. | |
| 7,573,136 | B2 | 8/2009 | Jiang et al. | |
| 7,580,312 | B2 | 8/2009 | Rajan et al. | |
| 7,581,121 | B2 | 8/2009 | Barth et al. | |
| 7,581,127 | B2 | 8/2009 | Rajan et al. | |
| 7,590,796 | B2 | 9/2009 | Rajan et al. | |
| 7,599,205 | B2 | 10/2009 | Rajan | |
| 7,606,245 | B2 | 10/2009 | Ma et al. | |
| 7,609,567 | B2 | 10/2009 | Rajan et al. | |
| 7,613,880 | B2 | 11/2009 | Miura et al. | |
| 7,619,912 | B2 | 11/2009 | Bhakta et al. | |
| 7,724,589 | B2 | 5/2010 | Rajan et al. | |
| 7,730,338 | B2 | 6/2010 | Rajan et al. | |
| 7,761,724 | B2 | 7/2010 | Rajan et al. | |
| 2001/0000822 | A1 | 5/2001 | Dell et al. | 711/170 |
| 2001/0003198 | A1 | 6/2001 | Wu | |
| 2001/0011322 | A1 | 8/2001 | Stolt et al. | |
| 2001/0019509 | A1 | 9/2001 | Aho et al. | |

| | | | | | | |
|---|---|---|---|---|---|---|
| 2001/0021106 A1 | 9/2001 | Weber et al. | | 2004/0064647 A1 | 4/2004 | DeWhitt et al. ............... 711/135 |
| 2001/0021137 A1 | 9/2001 | Kai et al. | | 2004/0064767 A1 | 4/2004 | Huckaby et al. ............ 714/710 |
| 2001/0046129 A1 | 11/2001 | Broglia et al. | | 2004/0083324 A1 | 4/2004 | Rabinovitz et al. |
| 2001/0046163 A1 | 11/2001 | Yanagawa | | 2004/0088475 A1 | 5/2004 | Streif et al. ................. 711/105 |
| 2002/0002662 A1 | 1/2002 | Olarig et al. | | 2004/0100837 A1 | 5/2004 | Lee |
| 2002/0004897 A1 | 1/2002 | Kao et al. | | 2004/0117723 A1 | 6/2004 | Foss ............................. 714/805 |
| 2002/0015340 A1 | 2/2002 | Batinovich | | 2004/0123173 A1 | 6/2004 | Emberling et al. ........... 714/733 |
| 2002/0019961 A1 | 2/2002 | Blodgett ....................... 714/718 | | 2004/0125635 A1 | 7/2004 | Kuzmenka |
| 2002/0034068 A1 | 3/2002 | Weber et al. | | 2004/0133736 A1 | 7/2004 | Kyung ......................... 711/105 |
| 2002/0038405 A1 | 3/2002 | Leddige et al. ............... 711/115 | | 2004/0139359 A1 | 7/2004 | Samson et al. ................ 713/320 |
| 2002/0041507 A1 | 4/2002 | Woo et al. ...................... 365/51 | | 2004/0145963 A1 | 7/2004 | Byon ............................ 365/233 |
| 2002/0051398 A1 | 5/2002 | Mizugaki ..................... 365/222 | | 2004/0151038 A1 | 8/2004 | Ruckerbauer et al. |
| 2002/0060945 A1 | 5/2002 | Ikeda | | 2004/0174765 A1 | 9/2004 | Seo et al. ...................... 365/233 |
| 2002/0064073 A1 | 5/2002 | Chien ........................... 365/200 | | 2004/0177079 A1 | 9/2004 | Gluhovsky et al. ........... 707/100 |
| 2002/0064083 A1 | 5/2002 | Ryu et al. ..................... 365/233 | | 2004/0178824 A1 | 9/2004 | Pan |
| 2002/0089831 A1 | 7/2002 | Forthun | | 2004/0184324 A1 | 9/2004 | Pax .......................... 365/189.12 |
| 2002/0089970 A1 | 7/2002 | Asada et al. | | 2004/0186956 A1 | 9/2004 | Perego et al. ................. 711/115 |
| 2002/0094671 A1 | 7/2002 | Distefano et al. | | 2004/0188704 A1 | 9/2004 | Halbert et al. ................ 257/145 |
| 2002/0121650 A1 | 9/2002 | Minamio et al. | | 2004/0195682 A1 | 10/2004 | Kimura |
| 2002/0121670 A1 | 9/2002 | Minamio et al. | | 2004/0196732 A1 | 10/2004 | Lee ............................... 365/233 |
| 2002/0124195 A1 | 9/2002 | Nizar ............................ 713/320 | | 2004/0205433 A1 | 10/2004 | Gower et al. |
| 2002/0129204 A1 | 9/2002 | Leighnor et al. | | 2004/0208173 A1 | 10/2004 | Di Gregorio ................. 370/360 |
| 2002/0145900 A1 | 10/2002 | Schaefer .......................... 365/52 | | 2004/0225858 A1 | 11/2004 | Brueggen |
| 2002/0165706 A1 | 11/2002 | Raynham ....................... 703/25 | | 2004/0228166 A1 | 11/2004 | Braun et al. .................. 365/154 |
| 2002/0167092 A1 | 11/2002 | Fee et al. | | 2004/0228196 A1 | 11/2004 | Kwak et al. |
| 2002/0172024 A1 | 11/2002 | Hui et al. | | 2004/0228203 A1 | 11/2004 | Koo .............................. 365/233 |
| 2002/0174274 A1 | 11/2002 | Wu et al. ...................... 710/100 | | 2004/0230932 A1 | 11/2004 | Dickmann ...................... 716/10 |
| 2002/0184438 A1 | 12/2002 | Usui .............................. 711/106 | | 2004/0236877 A1 | 11/2004 | Burton |
| 2003/0002262 A1 | 1/2003 | Benisek et al. ............... 361/728 | | 2004/0250989 A1 | 12/2004 | Im et al. |
| 2003/0011993 A1 | 1/2003 | Summers et al. | | 2004/0256638 A1 | 12/2004 | Perego et al. ................. 257/200 |
| 2003/0016550 A1 | 1/2003 | Yoo et al. | | 2004/0257847 A1 | 12/2004 | Matsui et al. |
| 2003/0021175 A1 | 1/2003 | Tae Kwak .................... 365/219 | | 2004/0260957 A1 | 12/2004 | Jeddeloh et al. .............. 713/300 |
| 2003/0026155 A1 | 2/2003 | Yamagata | | 2004/0264255 A1 | 12/2004 | Royer ....................... 365/189.01 |
| 2003/0026159 A1 | 2/2003 | Frankowsky et al. | | 2004/0268161 A1 | 12/2004 | Ross ............................. 713/300 |
| 2003/0035312 A1 | 2/2003 | Halbert et al. | | 2005/0018495 A1 | 1/2005 | Bhakta et al. ................... 365/19 |
| 2003/0039158 A1 | 2/2003 | Horiguchi et al. | | 2005/0021874 A1 | 1/2005 | Georgiou et al. ............. 709/250 |
| 2003/0041295 A1 | 2/2003 | Hou et al. | | 2005/0024963 A1 | 2/2005 | Jakobs et al. |
| 2003/0061458 A1 | 3/2003 | Wilcox et al. ................ 711/167 | | 2005/0027928 A1 | 2/2005 | Avraham et al. ............. 711/103 |
| 2003/0061459 A1 | 3/2003 | Aboulenein et al. | | 2005/0028038 A1 | 2/2005 | Pomaranski et al. ........... 714/42 |
| 2003/0083855 A1 | 5/2003 | Fukuyama | | 2005/0034004 A1 | 2/2005 | Bunker et al. |
| 2003/0093614 A1 | 5/2003 | Kohn et al. ................... 711/105 | | 2005/0036350 A1 | 2/2005 | So et al. |
| 2003/0101392 A1 | 5/2003 | Lee ............................... 714/718 | | 2005/0041504 A1 | 2/2005 | Perego et al. |
| 2003/0105932 A1 | 6/2003 | David et al. .................. 711/167 | | 2005/0044303 A1 | 2/2005 | Perego et al. ..................... 711/5 |
| 2003/0117875 A1 | 6/2003 | Lee et al. ...................... 365/226 | | 2005/0044305 A1 | 2/2005 | Jakobs et al. ................. 711/105 |
| 2003/0123389 A1 | 7/2003 | Russell et al. | | 2005/0047192 A1 | 3/2005 | Matsui et al. ................. 365/145 |
| 2003/0126338 A1 | 7/2003 | Dodd et al. ................... 710/305 | | 2005/0071543 A1 | 3/2005 | Ellis et al. ..................... 711/106 |
| 2003/0127737 A1 | 7/2003 | Takahashi | | 2005/0078532 A1 | 4/2005 | Ruckerbauer et al. ........ 365/199 |
| 2003/0131160 A1 | 7/2003 | Hampel et al. .................. 710/22 | | 2005/0081085 A1 | 4/2005 | Ellis et al. ......................... 714/5 |
| 2003/0145163 A1 | 7/2003 | Seo et al. ...................... 711/106 | | 2005/0099834 A1 | 5/2005 | Funaba et al. |
| 2003/0158995 A1 | 8/2003 | Lee et al. ...................... 711/105 | | 2005/0102590 A1 | 5/2005 | Norris et al. .................. 714/719 |
| 2003/0164539 A1 | 9/2003 | Yau | | 2005/0105318 A1 | 5/2005 | Funaba et al. |
| 2003/0164543 A1 | 9/2003 | Kheng Lee | | 2005/0108460 A1 | 5/2005 | David |
| 2003/0182513 A1 | 9/2003 | Dodd et al. ................... 711/137 | | 2005/0127531 A1 | 6/2005 | Tay et al. |
| 2003/0183934 A1 | 10/2003 | Barrett | | 2005/0132158 A1 | 6/2005 | Hampel et al. ................ 711/167 |
| 2003/0189868 A1 | 10/2003 | Riesenman et al. ........... 365/226 | | 2005/0135176 A1 | 6/2005 | Ramakrishnan et al. |
| 2003/0189870 A1 | 10/2003 | Wilcox ......................... 365/233 | | 2005/0138267 A1 | 6/2005 | Bains et al. ................... 711/100 |
| 2003/0191888 A1 | 10/2003 | Klein ............................ 711/105 | | 2005/0138304 A1 | 6/2005 | Ramakrishnan et al. |
| 2003/0191915 A1 | 10/2003 | Saxena et al. ................. 711/160 | | 2005/0139977 A1 | 6/2005 | Nishio et al. .................. 257/686 |
| 2003/0200382 A1 | 10/2003 | Wells et al. ................... 711/106 | | 2005/0141199 A1 | 6/2005 | Chiou et al. .................. 361/704 |
| 2003/0200474 A1 | 10/2003 | Li .................................. 713/320 | | 2005/0149662 A1 | 7/2005 | Perego et al. ..................... 711/5 |
| 2003/0205802 A1 | 11/2003 | Segaram et al. | | 2005/0152212 A1 | 7/2005 | Yang et al. .................... 365/233 |
| 2003/0206476 A1 | 11/2003 | Joo | | 2005/0156934 A1 | 7/2005 | Perego et al. |
| 2003/0217303 A1 | 11/2003 | Chua-Eoan et al. | | 2005/0166026 A1 | 7/2005 | Ware et al. ................... 711/167 |
| 2003/0223290 A1 | 12/2003 | Park et al. ..................... 365/200 | | 2005/0193163 A1 | 9/2005 | Perego et al. ................. 711/105 |
| 2003/0227798 A1 | 12/2003 | Pax .......................... 365/189.12 | | 2005/0193183 A1 | 9/2005 | Barth et al. |
| 2003/0229821 A1 | 12/2003 | Ma ................................... 714/8 | | 2005/0194676 A1 | 9/2005 | Fukuda et al. |
| 2003/0230801 A1 | 12/2003 | Jiang et al. | | 2005/0194991 A1 | 9/2005 | Dour et al. ...................... 326/30 |
| 2003/0231540 A1 | 12/2003 | Lazar et al. | | 2005/0195629 A1 | 9/2005 | Leddige et al. ................. 365/51 |
| 2003/0231542 A1 | 12/2003 | Zaharinova-Papazova et al. ............... 365/226 | | 2005/0201063 A1 | 9/2005 | Lee et al. |
| 2003/0234664 A1 | 12/2003 | Yamagata | | 2005/0204111 A1 | 9/2005 | Natarajan ..................... 711/167 |
| 2004/0016994 A1 | 1/2004 | Huang | | 2005/0207255 A1 | 9/2005 | Perego et al. |
| 2004/0027902 A1 | 2/2004 | Ooishi et al. | | 2005/0210196 A1 | 9/2005 | Perego et al. ................. 711/115 |
| 2004/0034732 A1 | 2/2004 | Valin et al. ....................... 711/4 | | 2005/0223179 A1 | 10/2005 | Perego et al. ................. 711/154 |
| 2004/0034755 A1 | 2/2004 | LaBerge et al. | | 2005/0224948 A1 | 10/2005 | Lee et al. |
| 2004/0037133 A1 | 2/2004 | Park et al. ..................... 365/202 | | 2005/0232049 A1 | 10/2005 | Park |
| 2004/0044808 A1 | 3/2004 | Salmon et al. ................... 710/8 | | 2005/0235119 A1 | 10/2005 | Sechrest et al. ............... 711/158 |
| 2004/0047228 A1 | 3/2004 | Chen ............................. 365/232 | | 2005/0235131 A1 | 10/2005 | Ware ............................. 711/203 |
| 2004/0057317 A1 | 3/2004 | Schaefer | | 2005/0237838 A1 | 10/2005 | Kwak et al. .................. 365/222 |
| | | | | 2005/0243635 A1 | 11/2005 | Schaefer ....................... 365/227 |

| Publication No. | Date | Inventor | Class |
|---|---|---|---|
| 2005/0246558 A1 | 11/2005 | Ku | |
| 2005/0249011 A1 | 11/2005 | Maeda | |
| 2005/0259504 A1 | 11/2005 | Murtugh et al. | 365/233 |
| 2005/0263312 A1 | 12/2005 | Bolken et al. | |
| 2005/0265506 A1 | 12/2005 | Foss et al. | 375/376 |
| 2005/0269715 A1 | 12/2005 | Yoo | |
| 2005/0278474 A1 | 12/2005 | Perersen et al. | 711/5 |
| 2005/0281096 A1 | 12/2005 | Bhakta et al. | |
| 2005/0281123 A1 | 12/2005 | Bell et al. | 365/230.08 |
| 2005/0283572 A1 | 12/2005 | Ishihara | |
| 2005/0285174 A1 | 12/2005 | Saito et al. | 257/296 |
| 2005/0289292 A1 | 12/2005 | Morrow et al. | 711/105 |
| 2005/0289317 A1 | 12/2005 | Liou et al. | 711/170 |
| 2006/0002201 A1 | 1/2006 | Janzen | 365/191 |
| 2006/0010339 A1 | 1/2006 | Klein | 714/5 |
| 2006/0026484 A1 | 2/2006 | Hollums | 714/746 |
| 2006/0038597 A1 | 2/2006 | Becker et al. | |
| 2006/0039204 A1 | 2/2006 | Cornelius | |
| 2006/0039205 A1 | 2/2006 | Cornelius | 365/189.05 |
| 2006/0041711 A1 | 2/2006 | Miura et al. | 711/103 |
| 2006/0041730 A1 | 2/2006 | Larson | 711/167 |
| 2006/0044909 A1 | 3/2006 | Kinsley et al. | 365/222 |
| 2006/0044913 A1 | 3/2006 | Klein et al. | |
| 2006/0049502 A1 | 3/2006 | Goodwin et al. | |
| 2006/0050574 A1 | 3/2006 | Streif et al. | 365/194 |
| 2006/0056244 A1 | 3/2006 | Ware | 365/194 |
| 2006/0062047 A1 | 3/2006 | Bhakta et al. | |
| 2006/0067141 A1 | 3/2006 | Perego et al. | |
| 2006/0085616 A1 | 4/2006 | Zeighami et al. | 711/167 |
| 2006/0087900 A1 | 4/2006 | Bucksch et al. | |
| 2006/0090031 A1 | 4/2006 | Kirshenbaum et al. | 711/113 |
| 2006/0090054 A1 | 4/2006 | Choi et al. | 711/167 |
| 2006/0106951 A1 | 5/2006 | Bains | 710/5 |
| 2006/0112214 A1 | 5/2006 | Yeh | 711/103 |
| 2006/0112219 A1 | 5/2006 | Chawla et al. | |
| 2006/0117152 A1 | 6/2006 | Amidi et al. | 711/154 |
| 2006/0117160 A1 | 6/2006 | Jackson et al. | 711/170 |
| 2006/0118933 A1 | 6/2006 | Haba | |
| 2006/0120193 A1 | 6/2006 | Casper | |
| 2006/0123265 A1 | 6/2006 | Ruckerbauer et al. | |
| 2006/0126369 A1 | 6/2006 | Raghuram | |
| 2006/0129712 A1 | 6/2006 | Raghuram | 710/52 |
| 2006/0129740 A1 | 6/2006 | Ruckerbauer et al. | |
| 2006/0129755 A1 | 6/2006 | Raghuram | 711/105 |
| 2006/0133173 A1 | 6/2006 | Jain et al. | |
| 2006/0136791 A1 | 6/2006 | Nierle | |
| 2006/0149982 A1 | 7/2006 | Vogt | 713/320 |
| 2006/0174082 A1 | 8/2006 | Bellows et al. | |
| 2006/0176744 A1 | 8/2006 | Stave | 365/194 |
| 2006/0179333 A1 | 8/2006 | Brittain et al. | 713/320 |
| 2006/0179334 A1 | 8/2006 | Brittain et al. | 713/320 |
| 2006/0180926 A1 | 8/2006 | Mullen et al. | |
| 2006/0181953 A1 | 8/2006 | Rotenberg et al. | 365/230.06 |
| 2006/0195631 A1 | 8/2006 | Rajamani | |
| 2006/0198178 A1 | 9/2006 | Kinsley et al. | |
| 2006/0203590 A1 | 9/2006 | Mori et al. | |
| 2006/0206738 A1 | 9/2006 | Jeddeloh et al. | 713/320 |
| 2006/0233012 A1 | 10/2006 | Sekiguchi et al. | |
| 2006/0236165 A1 | 10/2006 | Cepulis et al. | |
| 2006/0236201 A1 | 10/2006 | Gower et al. | |
| 2006/0248261 A1 | 11/2006 | Jacob et al. | |
| 2006/0248387 A1 | 11/2006 | Nicholson et al. | 714/22 |
| 2006/0262586 A1 | 11/2006 | Solomon et al. | |
| 2006/0294295 A1 | 12/2006 | Fukuzo | 711/105 |
| 2007/0005998 A1 | 1/2007 | Jain et al. | |
| 2007/0050530 A1 | 3/2007 | Rajan | 711/5 |
| 2007/0058471 A1 | 3/2007 | Rajan et al. | 365/222 |
| 2007/0070669 A1 | 3/2007 | Tsern | |
| 2007/0088995 A1 | 4/2007 | Tsern et al. | 714/724 |
| 2007/0091696 A1* | 4/2007 | Niggemeier et al. | 365/198 |
| 2007/0106860 A1 | 5/2007 | Foster, Sr. et al. | 711/170 |
| 2007/0136537 A1 | 6/2007 | Doblar et al. | |
| 2007/0162700 A1 | 7/2007 | Fortin et al. | 711/118 |
| 2007/0188997 A1 | 8/2007 | Hockanson et al. | |
| 2007/0192563 A1 | 8/2007 | Rajan et al. | 711/202 |
| 2007/0195613 A1 | 8/2007 | Rajan et al. | 365/189.05 |
| 2007/0204075 A1 | 8/2007 | Rajan et al. | |
| 2007/0216445 A1 | 9/2007 | Raghavan et al. | 326/83 |
| 2007/0247194 A1 | 10/2007 | Jain | 326/87 |
| 2007/0279084 A1 | 12/2007 | Oh et al. | |
| 2007/0288683 A1 | 12/2007 | Panabaker et al. | 711/101 |
| 2007/0288686 A1 | 12/2007 | Arcedera et al. | 711/103 |
| 2007/0288687 A1 | 12/2007 | Panabaker et al. | 711/103 |
| 2008/0002447 A1 | 1/2008 | Gulachenski et al. | |
| 2008/0010435 A1 | 1/2008 | Smith et al. | |
| 2008/0025108 A1 | 1/2008 | Rajan et al. | 365/189.05 |
| 2008/0025122 A1 | 1/2008 | Schakel et al. | 365/222 |
| 2008/0025136 A1 | 1/2008 | Rajan et al. | 365/230.08 |
| 2008/0025137 A1 | 1/2008 | Rajan et al. | 365/239 |
| 2008/0027697 A1 | 1/2008 | Rajan et al. | 703/14 |
| 2008/0027702 A1 | 1/2008 | Rajan et al. | 703/21 |
| 2008/0027703 A1 | 1/2008 | Rajan et al. | 703/21 |
| 2008/0028135 A1 | 1/2008 | Rajan et al. | |
| 2008/0028136 A1 | 1/2008 | Schakel et al. | 711/106 |
| 2008/0028137 A1 | 1/2008 | Schakel et al. | |
| 2008/0031030 A1 | 2/2008 | Rajan et al. | 365/63 |
| 2008/0031072 A1 | 2/2008 | Rajan et al. | 365/227 |
| 2008/0037353 A1 | 2/2008 | Rajan et al. | 365/227 |
| 2008/0056014 A1 | 3/2008 | Rajan et al. | 365/189.03 |
| 2008/0062773 A1 | 3/2008 | Rajan et al. | 365/189.03 |
| 2008/0065820 A1 | 3/2008 | Gillingham et al. | 711/105 |
| 2008/0082763 A1 | 4/2008 | Rajan et al. | 711/154 |
| 2008/0086588 A1 | 4/2008 | Danilak et al. | |
| 2008/0089034 A1 | 4/2008 | Hoss et al. | |
| 2008/0098277 A1 | 4/2008 | Hazelzet | |
| 2008/0103753 A1 | 5/2008 | Rajan et al. | |
| 2008/0104314 A1 | 5/2008 | Rajan et al. | |
| 2008/0109206 A1 | 5/2008 | Rajan et al. | |
| 2008/0109595 A1 | 5/2008 | Rajan et al. | |
| 2008/0109597 A1 | 5/2008 | Schakel et al. | |
| 2008/0109598 A1 | 5/2008 | Schakel et al. | |
| 2008/0115006 A1 | 5/2008 | Smith et al. | 713/601 |
| 2008/0120443 A1 | 5/2008 | Rajan et al. | |
| 2008/0120458 A1 | 5/2008 | Gillingham et al. | 711/105 |
| 2008/0123459 A1 | 5/2008 | Rajan et al. | 365/227 |
| 2008/0126687 A1 | 5/2008 | Rajan et al. | |
| 2008/0126688 A1 | 5/2008 | Rajan et al. | |
| 2008/0126689 A1 | 5/2008 | Rajan et al. | |
| 2008/0126690 A1 | 5/2008 | Rajan et al. | 711/105 |
| 2008/0126692 A1 | 5/2008 | Rajan et al. | |
| 2008/0133825 A1 | 6/2008 | Rajan et al. | |
| 2008/0155136 A1 | 6/2008 | Hishino | |
| 2008/0159027 A1* | 7/2008 | Kim | 365/198 |
| 2008/0170425 A1 | 7/2008 | Rajan | |
| 2008/0195894 A1 | 8/2008 | Schreck et al. | |
| 2008/0239857 A1 | 10/2008 | Rajan et al. | 365/227 |
| 2008/0239858 A1 | 10/2008 | Rajan et al. | 365/227 |
| 2009/0024789 A1 | 1/2009 | Rajan et al. | |
| 2009/0024790 A1 | 1/2009 | Rajan et al. | |
| 2009/0109613 A1 | 4/2009 | Legen et al. | |
| 2009/0216939 A1 | 8/2009 | Smith et al. | |
| 2009/0285031 A1 | 11/2009 | Rajan et al. | |
| 2009/0290442 A1 | 11/2009 | Rajan | |
| 2010/0005218 A1 | 1/2010 | Gower et al. | |
| 2010/0020585 A1 | 1/2010 | Rajan | |
| 2010/0257304 A1 | 10/2010 | Rajan et al. | |
| 2010/0271888 A1 | 10/2010 | Rajan | |
| 2010/0281280 A1 | 11/2010 | Rajan et al. | |

FOREIGN PATENT DOCUMENTS

| | | |
|---|---|---|
| DE | 102004053316 | 5/2006 |
| DE | 102005036528 | 2/2007 |
| EP | 0644547 | 3/1995 |
| JP | 62121978 | 6/1987 |
| JP | 01171047 | 7/1989 |
| JP | 03-029357 | 2/1991 |
| JP | 03029357 | 2/1991 |
| JP | 03/276487 | 12/1991 |
| JP | 03286234 | 12/1991 |
| JP | 07-141870 | 6/1995 |
| JP | 08/077097 | 3/1996 |
| JP | 08077097 | 3/1996 |
| JP | 11-149775 | 6/1999 |
| JP | 2002025255 | 1/2002 |
| JP | 3304893 B2 | 5/2002 |
| JP | 2006236388 | 9/2006 |
| KR | 1020040062717 | 7/2004 |
| WO | WO 95/05676 | 2/1995 |

| | | |
|---|---|---|
| WO | WO9900734 | 1/1999 |
| WO | WO01/90900 | 11/2001 |
| WO | WO01/97160 | 12/2001 |
| WO | WO2007002324 | 1/2007 |
| WO | WO2007/028109 | 3/2007 |
| WO | WO 2007/038225 | 4/2007 |
| WO | WO2007/095080 | 8/2007 |
| WO | WO 2008063251 | 5/2008 |

OTHER PUBLICATIONS

Final Office Action from U.S. Appl. No. 11/461,435 mailed on Jan. 28, 2009.
Non-final Office Action from U.S. Appl. No. 11/461,437 mailed on Jan. 26, 2009.
Non-final Office Action from U.S. Appl. No. 11/939,432 mailed on Feb. 6, 2009.
Wu et al., "eNVy: A Non-Volatile, Main Memory Storage System," ASPLOS-VI Proceedings—Sixth International Conference on Architectural Support for Programming Languages and Operating Systems, San Jose, California, Oct. 4-7, 1994. SIGARCH Computer Architecture News 22(Special Issue Oct. 1994).
Great Britain Office Action from GB Patent Application No. GB0800734.6 Mailed Mar. 1, 2010.
Final Office Action from U.S. Appl. No. 11/461,420 Mailed Apr. 28, 2010.
Notice of Allowance from U.S. Appl. No. 11/553,372 Mailed Mar. 12, 2010.
Notice of Allowance from U.S. Appl. No. 11/553,399 Mailed Mar. 22, 2010.
Non-Final Office Action from U.S. Appl. No. 11/588,739 Mailed Dec. 29, 2009.
Notice of Allowance from U.S. Appl. No. 11/611,374 Mailed Apr. 5, 2010.
Non-Final Office Action from U.S. Appl. No. 11/828,181 Mailed Mar. 2, 2010.
Non-Final Office Action from U.S. Appl. No. 11/828,182 Mailed Mar. 29, 2010.
Final Office Action from U.S. Appl. No. 11/858,518 Mailed Apr. 21, 2010.
Non-Final Office Action from U.S. Appl. No. 11/929,432 Mailed Jan. 14, 2010.
Non-Final Office Action from U.S. Appl. No. 11/929,571 Mailed Mar. 3, 2010.
Non-Final Office Action from U.S. Appl. No. 11/929,631 Mailed Mar. 3, 2010.
Non-Final Office Action from U.S. Appl. No. 11/929,636 Mailed Mar. 9, 2010.
Non-Final Office Action from U.S. Appl. No. 11/929,655 Mailed Mar. 3, 2010.
Notice of Allowance from U.S. Appl. No. 11/939,432 Mailed Dec. 1, 2009.
Non-Final Office Action from U.S. Appl. No. 11/939,432 Mailed Apr. 12, 2010.
Notice of Allowance from U.S. Appl. No. 12/111,819 Mailed Mar. 10, 2010.
Non-Final Office Action from U.S. Appl. No. 12/507,682 Mailed Mar. 8, 2010.
German Office Action From German Patent Application No. 11 2006 002 300.4-55 Mailed Jun. 5, 2009 (With Translation).
Non-Final Office Action From U.S. Appl. No. 11/461,430 Mailed Feb. 19, 2009.
Final Office Action From U.S. Appl. No. 11/461,435 Mailed Jan. 28, 2009.
Non-Final Office Action From U.S. Appl. No. 11/461,437 Mailed Jan. 26, 2009.
Non-Final Office Action From U.S. Appl. No. 11/461,441 Mailed Apr. 2, 2009.
Non-Final Office Action From U.S. Appl. No. 11/611,374 Mailed Mar. 23, 2009.
Non-Final Office Action From U.S. Appl. No. 11/762,010 Mailed Mar. 20, 2009.
Non-Final Office Action From U.S. Appl. No. 11/939,432 Mailed Feb. 6, 2009.
Non-Final Office Action From U.S. Appl. No. 12/111,819 Mailed Apr. 27, 2009.
Non-Final Office Action From U.S. Appl. No. 12/111,828 Mailed Apr. 17, 2009.
Kellerbauer "Die Schnelle Million," with translation, "The quick million.", Apr. 2008.
Wu et al., "eNVy: A Non-Volatile, Main Memory Storage System," to appear in ASPLOS VI.
"Using Two Chip Selects to Enable Quad Rank," IP.com PriorArtDatabase; copyright IP.com, Inc. 2004.
"BIOS and Kernel Developer's Guide (BKDG) for AMD Family 10h Processors," AMD, 31116 Rev 3.00, Sep. 7, 2007.
Skerlj et al., "Buffer Device for Memory Modules (DIMM)" Qimonda 2006, p. 1.
Written Opinion from PCT Application No. PCT/US06/24360 mailed on Jan. 8, 2007.
Preliminary Report on Patentability from PCT Application No. PCT/US06/24360 mailed on Jan. 10, 2008.
Written Opinion from International PCT Application No. PCT/US06/34390 mailed on Nov. 21, 2007.
International Search Report from PCT Application No. PCT/US06/34390 mailed on Nov. 21, 2007.
Office Action from U.S. Appl. No. 11/461,427 mailed on Sep. 5, 2008.
Final Office Action from U.S. Appl. No. 11/461,430 mailed on Sep. 8, 2008.
Notice of Allowance from U.S. Appl. No. 11/474,075 mailed on Nov. 26, 2008.
Office Action from U.S. Appl. No. 11/474,076 mailed on Nov. 3, 2008.
Office Action from U.S. Appl. No. 11/524,811 mailed on Sep. 17, 2008.
Fang et al., W. Power Complexity Analysis Of Adiabatic SRAM, 6th Int. Conference On ASIC, vol. 1, Oct. 2005, pp. 334-337.
Pavan et al., P. A Complete Model Of E2PROM Memory Cells For Circuit Simulations, IEEE Transactions On Computer-Aided Design Of Integrated Circuits And Systems, vol. 22, No. 8, Aug. 2003, pp. 1072-1079.
German Office Action from German Patent Application No. 11 2006 001 810.8-55 Dated Feb. 18, 2009 (With Translation).
Non-Final Office Action from U.S. Appl. No. 11/461,420 Dated Jul. 23, 2009.
Notice Of Allowance from U.S. Appl. No. 11/461,430 Dated Sep. 9, 2009.
Non-Final Office Action from U.S. Appl. No. 11/461,435 Dated Aug. 5, 2009.
Final Rejection From U.S. Appl. No. 11/461,437 Dated Nov. 10, 2009.
Non-Final Office Action from U.S. Appl. No. 11/515,167 Dated Sep. 25, 2009.
Non-Final Office Action from U.S. Appl. No. 11/515,223 Dated Sep. 22, 2009.
Non-Final Office Action from U.S. Appl. No. 11/538,041 Dated Jun. 10, 2009.
Non-Final Office Action from U.S. Appl. No. 11/553,372 Dated Jun. 25, 2009.
Notice Of Allowance from U.S. Appl. No. 11/553,372 Dated Sep. 30, 2009.
Non-Final Office Action from U.S. Appl. No. 11/553,390 Dated Sep. 9, 2009.
Non-Final Office Action from U.S. Appl. No. 11/553,399 Dated Jul. 7, 2009.
Notice Of Allowance from U.S. Appl. No. 11/553,399 Dated Oct. 13, 2009.
Notice Of Allowance from U.S. Appl. No. 11/611,374 Dated Sep. 15, 2009.
Notice Of Allowance from U.S. Appl. No. 11/611,374 Dated Nov. 30, 2009.
Non-Final Rejection From U.S. Appl. No. 11/672,921 Dated Dec. 8, 2009.
Non-Final Rejection From U.S. Appl. No. 11/672,924 Dated Dec. 14, 2009.

Non-Final Office Action from U.S. Appl. No. 11/702,960 Dated Sep. 25, 2009.
Non-Final Office Action from U.S. Appl. No. 11/702,981 Dated Aug. 19, 2009.
Final Rejection From U.S. Appl. No. 11/762,010 Dated Dec. 4, 2009.
Non-Final Office Action from U.S. Appl. No. 11/762,013 Dated Jun. 5, 2009.
Non-Final Office Action from U.S. Appl. No. 11/763,365 Dated Oct. 28, 2009.
Non-Final Office Action from U.S. Appl. No. 11/858,518 Dated Aug. 14, 2009.
Non-Final Rejection From U.S. Appl. No. 11/929,225 Dated Dec. 14, 2009.
Non-Final Rejection From U.S. Appl. No. 11/929,261 Dated Dec. 14, 2009.
Non-Final Office Action from U.S. Appl. No. 11/929,500 Dated Oct. 13, 2009.
Notice Of Allowance from U.S. Appl. No. 11/939,432 Dated Sep. 24, 2009.
Notice Of Allowance from U.S. Appl. No. 12/111,819 Dated Nov. 20, 2009.
Notice Of Allowance from U.S. Appl. No. 12/111,828 Dated Dec. 15, 2009.
Supplemental European Search Report and Search Opinion issued Sep. 21, 2009 in European Application No. 07870726.2, 8 pp.
Wu et al., "eNVy: A Non-Volatile, Main Memory Storage System", ASPLOS-VI Proceedings, Oct. 4-7, 1994, pp. 86-97.
Buffer Device for Memory Modules (DIMM), IP.com Prior Art Database, <URL: http://ip.com/IPCOM/000144850>, Feb. 10, 2007, 1 pg.
German Office Action from German Patent Application No. 11 2006 002 300.4-55 Dated May 11, 2009 (With Translation).
Great Britain Office Action from GB Patent Application No. GB0803913.3 Dated Mar. 1, 2010.
International Preliminary Examination Report From PCT Application No. PCT/US07/016385 Dated Feb. 3, 2009.
Search Report and Written Opinion From PCT Application No. PCT/US07/03460 Dated on Feb. 14, 2008.
Final Office Action from U.S. Appl. No. 11/461,435 Dated May 13, 2010.
Final Office Action from U.S. Appl. No. 11/515,167 Dated Jun. 3, 2010.
Notice Of Allowance from U.S. Appl. No. 11/515,223 Dated Jul. 30, 2010.
Notice Of Allowance from U.S. Appl. No. 11/553,372 Dated Aug. 4, 2010.
Final Office Action from U.S. Appl. No. 11/553,390 Dated Jun. 24, 2010.
Notice Of Allowance from U.S. Appl. No. 11/553,399 Dated Dec. 3, 2010.
Notice Of Allowance from U.S. Appl. No. 11/611,374 Dated Jul. 19, 2010.
Notice Of Allowance from U.S. Appl. No. 11/611,374 Dated Oct. 29, 2010.
Final Office Action from U.S. Appl. No. 11/672,921 Dated Jul. 23, 2010.
Final Office Action from U.S. Appl. No. 11/672,924 Dated Sep. 7, 2010.
Final Office Action from U.S. Appl. No. 11/702,960 Dated Jun. 21, 2010.
Non-Final Office Action from U.S. Appl. No. 11/702,981 Dated Mar. 11, 2009.
Notice Of Allowance from U.S. Appl. No. 11/762,010 Dated Jul. 2, 2010.
Notice Of Allowance from U.S. Appl. No. 11/762,010 Dated Oct. 22, 2010.
Notice Of Allowance from U.S. Appl. No. 11/762,013 Dated Aug. 17, 2010.
Notice Of Allowance from U.S. Appl. No. 11/762,013 Dated Dec. 7, 2010.
Notice Of Allowance from U.S. Appl. No. 11/763,365 Dated Jun. 29, 2010.
Notice of Allowance from U.S. Appl. No. 11/763,365 Dated Oct. 20, 2010.
Non-Final Office Action from U.S. Appl. No. 11/855,805 Dated Sep. 21, 2010.
Non-Final Office Action from U.S. Appl. No. 11/858,518 Dated Sep. 8, 2010.
Final Office Action from U.S. Appl. No. 11/929,225 Dated Aug. 27, 2010.
Final Office Action from U.S. Appl. No. 11/929,261 Dated Sep. 7, 2010.
Final Office Action from U.S. Appl. No. 11/929,286 Dated Aug. 20, 2010.
Notice of Allowance from U.S. Appl. No. 11/929,320 Dated Sep. 29, 2010.
Final Office Action from U.S. Appl. No. 11/929,403 Dated Aug. 31, 2010.
Final Office Action from U.S. Appl. No. 11/929,417 Dated Aug. 31, 2010.
Final Office Action from U.S. Appl. No. 11/929,432 Dated Aug. 20, 2010.
Final Office Action from U.S. Appl. No. 11/929,450 Dated Aug. 20, 2010.
Notice of Allowance from U.S. Appl. No. 11/929,483 Dated Oct. 7, 2010.
Final Office Action from U.S. Appl. No. 11/929,500 Dated Jun. 24, 2010.
Final Office Action from U.S. Appl. No. 11/929,631 Dated Nov. 18, 2010.
Final Office Action from U.S. Appl. No. 11/929,655 Dated Nov. 22, 2010.
Non-Final Office Action from U.S. Appl. No. 11/939,440 Dated Sep. 17, 2010.
Non-Final Office Action from U.S. Appl. No. 12/057,306 Dated Oct. 8, 2010.
Non-Final Office Action from U.S. Appl. No. 12/203,100 Dated Dec. 1, 2010.
Non-Final Office Action from U.S. Appl. No. 12/574,628 Dated Jun. 10, 2010.
Non-Final Office Action from U.S. Appl. No. 12/769,428 Dated Nov. 8, 2010.
Non-Final Office Action from U.S. Appl. No. 12/838,896 Dated Sep. 3, 2010.
Search Report From PCT Application No. PCT/US10/038041 Dated Aug. 23, 2010.
Non-Final Office Action from U.S. Appl. No. 11/461,437 Dated Jan. 4, 2011.
Notice Of Allowance from U.S. Appl. No. 11/515,223 Dated Feb. 4, 2011.
Non-Final Office Action from U.S. Appl. No. 11/553,372 Dated Jan. 5, 2011.
Final Office Action from U.S. Appl. No. 11/588,739 Dated Dec. 15, 2010.
Notice Of Allowance from U.S. Appl. No. 11/762,010 Dated Feb. 18, 2011.
Final Office Action from U.S. Appl. No. 11/828,182 Dated Dec. 22, 2010.
Non-Final Office Action from U.S. Appl. No. 11/855,826 Dated Jan. 13, 2011.
Notice Of Allowance from U.S. Appl. No. 11/939,432 Dated Feb. 18, 2011.
Notice Of Allowance from U.S. Appl. No. 12/144,396 Dated Feb. 1, 2011.
Non-Final Office Action from U.S. Appl. No. 12/816,756 Dated Feb. 7, 2011.
Notice of Allowance from U.S. Appl. No. 11/762,013 Dated Feb. 23, 2011.
Notice of Allowance from U.S. Appl. No. 11/929,500 Dated Feb. 24, 2011.
Notice of Allowance from U.S. Appl. No. 11/763,365 Dated Mar. 1, 2011.
Final Office Action from U.S. Appl. No. 12/574,628 Dated Mar. 3, 2011.

Final Office Action from U.S. Appl. No. 11/929,571 Dated Mar. 3, 2011.
Notice of Allowance from U.S. Appl. No. 11/611,374 Dated Mar. 4, 2011.
Notice of Allowance from U.S. Appl. No. 11/929,483 Dated Mar. 4, 2011.
Notice of Allowance from U.S. Appl. No. 11/553,399 Dated Mar. 18, 2011.
Final Office Action from U.S. Appl. No. 12/507,682 Dated Mar. 29, 2011.
Non-Final Office Action from U.S. Appl. No. 11/929,403 Dated Mar. 31, 2011.
Non-Final Office Action from U.S. Appl. No. 11/929,417 Dated Mar. 31, 2011.
Notice of Allowance from U.S. Appl. No. 12/838,896 Dated Apr. 19, 2011.
Notice of Allowance from U.S. Appl. No. 11/702,981 Dated Apr. 25, 2011.
Notice of Allowance from U.S. Appl. No. 11/929,320 Dated May 5, 2011.
Final Office Action from U.S. Appl. No. 11/939,440 Dated May 19, 2011.
Non-Final Office Action from U.S. Appl. No. 12/574,628 Dated Sep. 20, 2011.
Final Office Action from U.S. Appl. No. 11/855,805, Dated May 26, 2011.
Non-Final Office Action from U.S. Appl. No. 11/672,921 Dated May 27, 2011.
Notice of Allowance from U.S. Appl. No. 11/762,010 Dated Jun. 8, 2011.
Non-Final Office Action from U.S. Appl. No. 11/672,924 Dated Jun. 8, 2011.
Non-Final Office Action from U.S. Appl. No. 11/929,225 Dated Jun. 8, 2011.
Notice of Allowance from U.S. Appl. No. 11/929,500 Dated Jun. 13, 2011.
Final Office Action from U.S. Appl. No. 12/057,306 Dated Jun. 15, 2011.
Final Office Action from U.S. Appl. No. 12/769,428 Dated Jun. 16, 2011.
Notice of Allowance from U.S. Appl. No. 12/203,100 Dated Jun. 17, 2011.
Notice of Allowance from U.S. Appl. No. 11/762,013 Dated Jun. 20, 2011.
Non-Final Office Action from U.S. Appl. No. 12/797,557 Dated Jun. 21, 2011.
Notice of Allowance from U.S. Appl. No. 11/929,483 Dated Jun. 23, 2011.
Non-Final Office Action from U.S. Appl. No. 11/702,960 Dated Jun. 23, 2011.
Non-Final Office Action from U.S. Appl. No. 11/929,655 Dated Jun. 24, 2011.
Notice of Allowance from U.S. Appl. No. 11/763,365 Dated Jun. 24, 2011.
Notice of Allowance from U.S. Appl. No. 11/611,374 Dated Jun. 24, 2011.
Non-Final Office Action from U.S. Appl. No. 11/828,182 Dated Jun. 27, 2011.
Non-Final Office Action from U.S. Appl. No. 11/828,181 Dated Jun. 27, 2011.
Non-Final Office Action from U.S. Appl. No. 12/378,328 Dated Jul. 15, 2011.
Final Office Action from U.S. Appl. No. 11/461,420 Dated Jul. 20, 2011.
Notice of Allowance from U.S. Appl. No. 11/461,437 Dated Jul. 25, 2011.
Notice of Allowance from U.S. Appl. No. 11/702,981 Dated Aug. 5, 2011.
Notice of Allowability from U.S. Appl. No. 11/855,826 Dated Aug. 15, 2011.

* cited by examiner

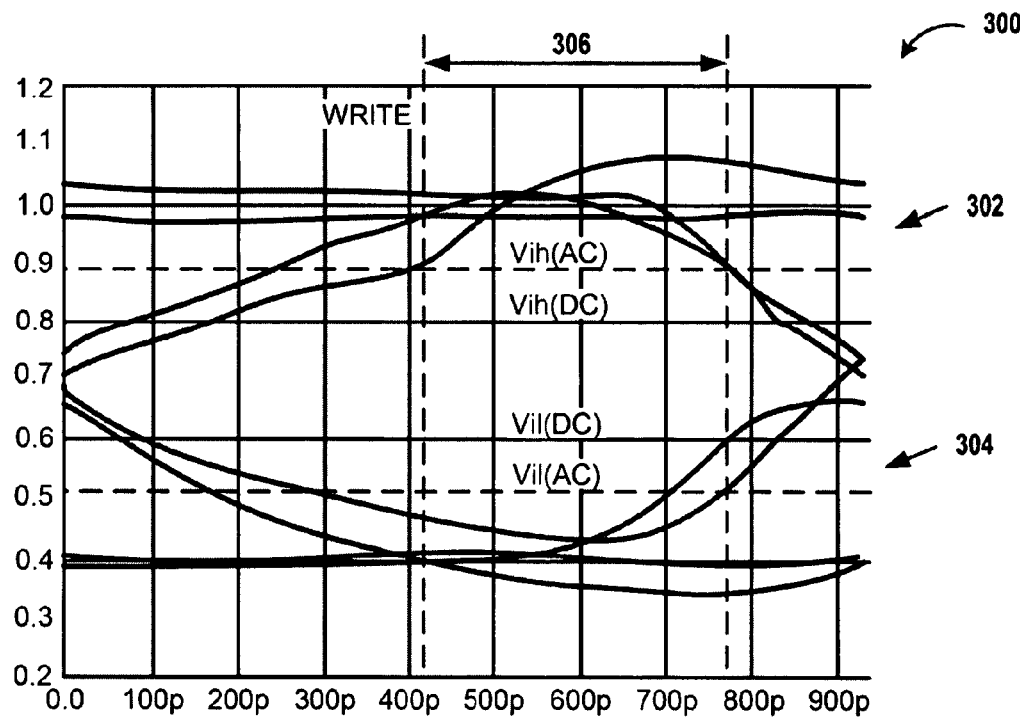
FIGURE 3A
(PRIOR ART)
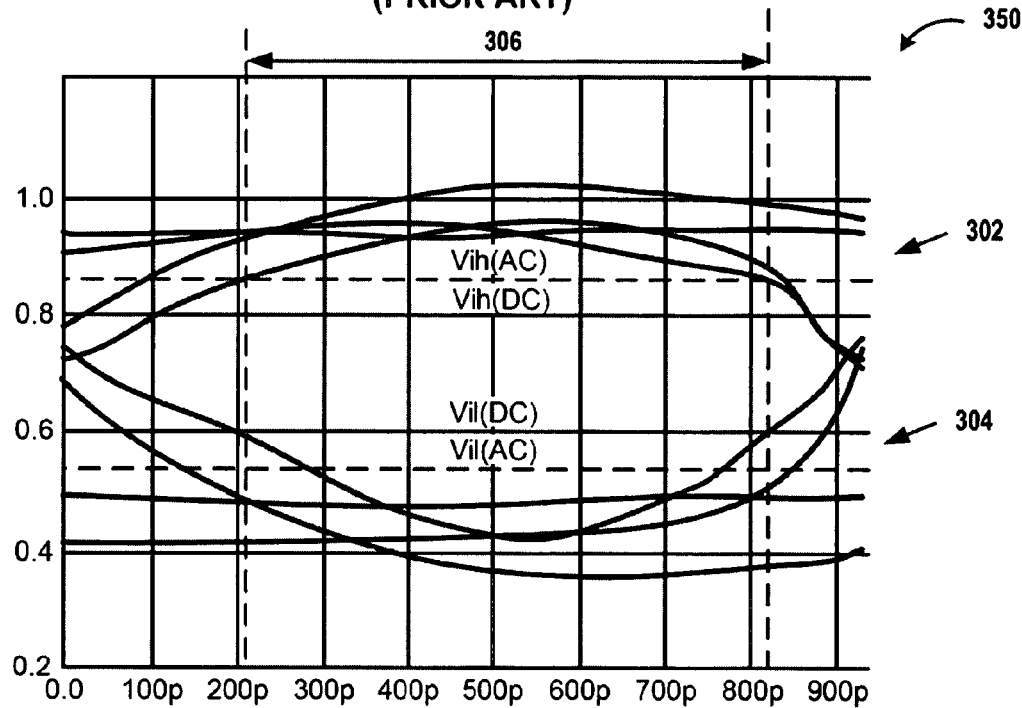
FIGUER 3B

OPTIMAL CHANNEL DESIGN FOR MEMORY DEVICES FOR PROVIDING A HIGH-SPEED MEMORY INTERFACE

FIELD OF THE INVENTION

The present invention relates to circuit boards, and more particularly to providing communication between a memory controller and memory devices.

BACKGROUND

There is an ever-increasing desire for faster and more compact semiconductor memory with an increasing amount of functionality. One challenge in the design of memory subsystems involves utilizing readily available manufacturing techniques and materials. In many cases, a memory subsystem designer may have limited control of some of the components of the system, or as is sometimes the case in memory subsystems, many components of the memory subsystem are defined by actual or de-facto standards. Extreme economic demands are placed on the memory subsystem designer to find techniques to improve the speed and capacity of the subsystem while maintaining high reliability standards, low cost, and small form factor.

Commercial embodiments of memory systems often contain a memory controller, package and PCB interconnects, and at least one dual in-line memory module (DIMM). Often, the topology of the electrical connectivity between a memory controller and one or more DIMMs is characterized by different interconnect distances between the memory controller and DIMM #1, DIMM #2, DIMM#3, etc. Such a configuration is known as a multi-drop bus topology.

A structure of transmission conductor, dielectric substrate material, and conductive reference plane is often referred to as a transmission line, for carrying signals. A group of transmission lines connecting multiple chips are usually called a channel. The transmission channel has higher transmission bandwidth if its impedance profile is better matched along the channel. As DIMMs are added to the multi-drop configuration, additional capacitive loads as well as additional impedance discontinuity points are presented in the transmission channel, which in turn may have the effect to decrease the maximum speed of communication through the channel.

Capacitive loading limits the maximum channel bandwidth. Additionally, impedance discontinuity of the channel exhibits the inherently undesirable phenomenon of multiple reflections and resonance, both of which phenomenon tend to decrease the maximum speed of communication through the channel. There is thus a need for addressing these and/or other issues associated with the prior art.

SUMMARY

A system is provided for high-speed communication between a memory controller and a plurality of memory devices. A memory controller, and a plurality of memory devices are provided. Additionally, at least one channel is included for providing electrical communication between the memory controller and the plurality of memory devices, an impedance of the channel being at least partially controlled using High Density Interconnect (HDI) technology.

BRIEF DESCRIPTION OF THE DRAWINGS

FIG. 3A shows an eye diagram of a data write cycle associated with the prior art.

FIG. 3B shows an eye diagram of a data write cycle, in accordance with one embodiment.

DETAILED DESCRIPTION

Figure 1A:
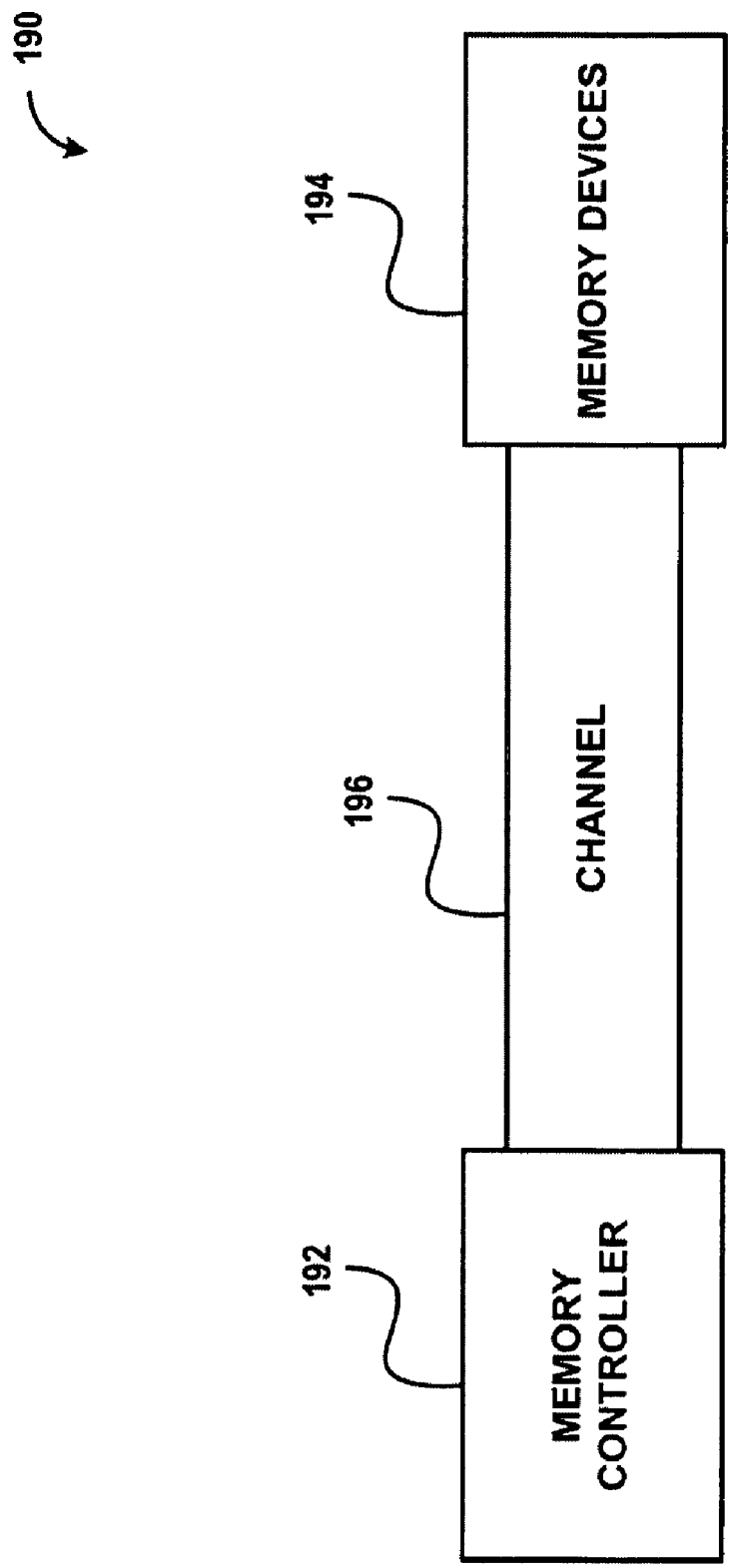
FIG. 1A shows a system for providing electrical communication between a memory controller and a plurality of memory devices, in accordance with one embodiment.

FIG. 1A shows a system 190 for providing electrical communication between a memory controller and a plurality of memory devices, in accordance with one embodiment. As shown, a memory controller 192 is provided. Additionally, a plurality of memory devices 194 are provided. Still yet, a channel 196 is included for providing electrical communication between the memory controller 192 and the plurality of memory devices 196, an impedance of the channel being at least partially controlled using High Density Interconnect (HDI) technology. In the context of the present description, HDI refers to a technology utilized to condense integrated circuit packaging and printed circuit boards (PCBs) in order to obtain higher electrical performance, higher scale of integration, and more design convenience.

Additionally, in the context of the present description, a channel refers to any component, connection, or group of components and/or connections, used to provide electrical communication between a memory device and a memory controller. For example, in various embodiments, the channel 196 may include PCB transmission lines, module connectors, component packages, sockets, and/or any other components or connections that fit the above definition. Furthermore, the memory devices 194 may include any type of memory device. For example, in one embodiment, the memory devices 194 may include dynamic random access memory (DRAM). Additionally, the memory controller 192 may be any device capable of sending instructions or commands, or otherwise controlling the memory devices 194.

In one embodiment, the channel 196 may be connected to a plurality of DIMMs. In this case, at least one of the DIMMs may include a micro-via. In the context of the present description, a micro-via refers to a via constructed utilizing micro-via technology. A via refers to any pad or strip with a plated hole that connects tracks from one layer of a substrate (e.g. a PCB) to another layer or layers.

In another embodiment, at least one of the DIMMs may include a microstrip trace constructed on a board using HDI technology. In this case, a microstrip refers to any electrical transmission line on the surface layer of a PCB which can be used to convey electrical signals. As an option, the DIMMs may include a read and/or write path. In this case, impedance controlling may be utilized to adjust signal integrity properties of the read and/or write communication path. In one embodiment, the impedance controlling may use HDI technology. In the context of the present description, impedance controlling refers to any altering or configuring of the impedance of a component.

As an option, at least one interface circuit (not shown) may also be provided for allowing electrical communication between the memory controller 192 and at least one of the memory devices 194, where the interface circuit may be utilized as an intermediate buffer or repeater chip between the memory controller 192 and at least one memory device 194. In this case, the interface circuit may be included as part of a DIMM. In one embodiment, the interface circuit may be electronically positioned between the memory controller 192 and at least one of the plurality of memory devices 194. In this case, signals from the memory controller 192 to the memory devices 194 will pass though the interface circuit.

As an option, the interface circuit may include at least one programmable I/O driver. In such case, the programmable I/O driver may be utilized to buffer the signals from memory controller 192, recover the signal waveform quality, and resend them to at least one downstream memory device 194.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
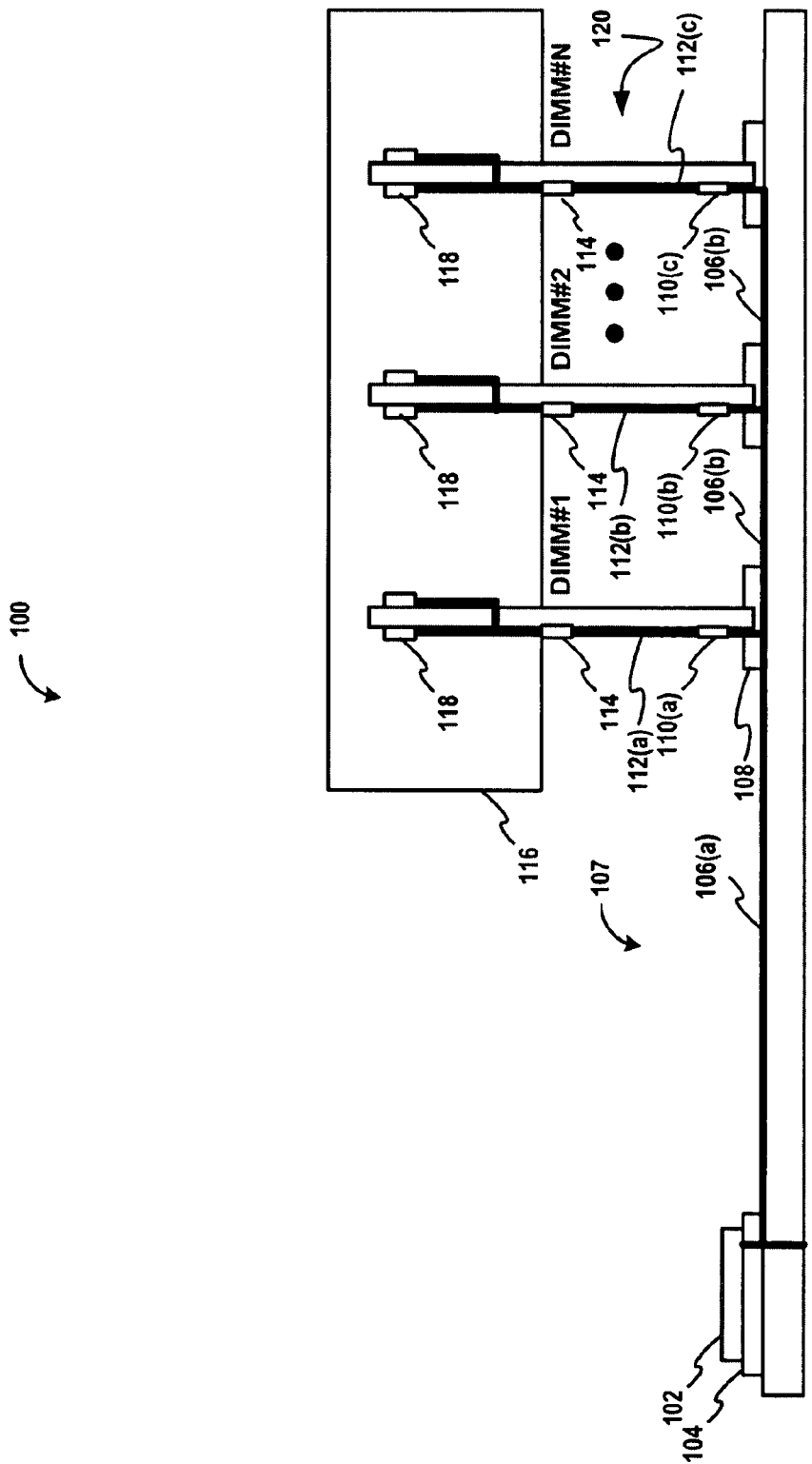
FIG. 1B shows a system for providing electrical communication between a host controller chip package and one or more memory devices.

FIG. 1B shows a system 100 for providing electrical communication between a host controller chip package 102 and one or more memory devices 118. The electrical signals traverse paths from the host controller chip package 102 through a socket 104, traces 106(a)-106(b) on the surface of a printed circuit board (PCB) 107, through a DIMM connector 108, a resistor stub (Rstub) 110(a)-110(c), traces 112(a)-112(b) on the surface of the DIMMs 120, any other interface connectors or circuits 114, and finally to one or more memory devices 118 (e.g. DRAM, etc.).

As shown further, a plurality of DIMMs 120 may be provided (e.g. DIMM#1-DIMM#N). Any number of DIMMs 120 may be included. In such a configuration, the topology of the communication between the host controller chip package 102 and the memory devices 118 is called a multi-drop topology.

Figure 1C:
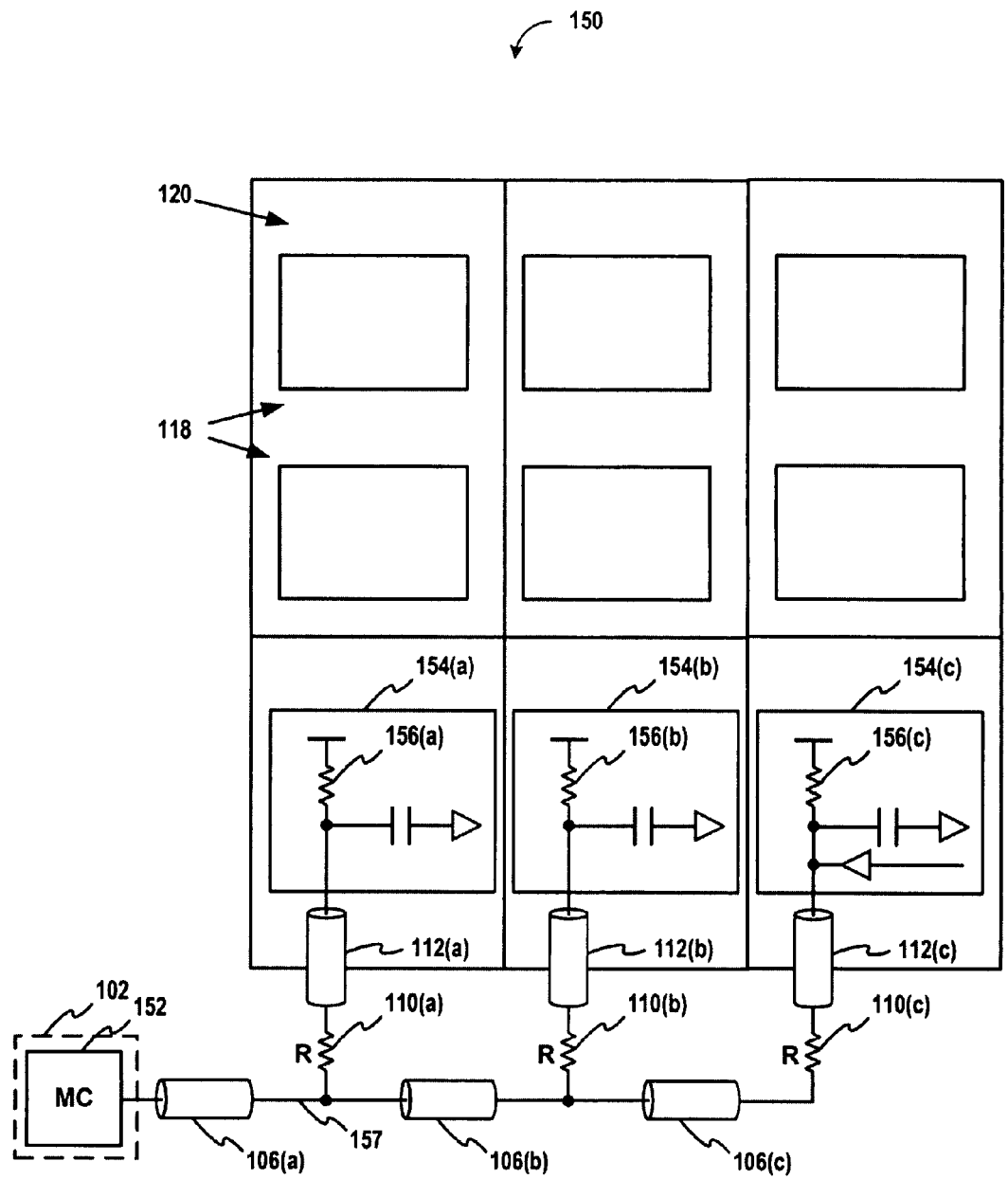
FIG. 1C illustrates a system corresponding to a schematic representation of the topology and interconnects for FIG. 1B.

FIG. 1C illustrates a system 150 corresponding to a schematic representation of the topology and interconnects for FIG. 1B. As shown in FIG. 1C, a memory controller 152 which may be part of the host controller chip package 102 is connected to a buffer chip 154(a) through traces (e.g. transmission lines) 106(a) and 112(a). Similarly, the memory controller 152 is connected to a buffer chip 154(b) through traces 106(a), 106(b), and 112(b). As shown further, the memory controller 152 is connected to a buffer chip 154(c) through traces 106(a)-106(c), and 112(c). Together, the traces form a channel such that the memory controller 152 may maintain electrical communication with the plurality of memory devices 118.

It should be noted that, in various embodiments the system 150 may include a motherboard (e.g. the PCB 107), multiple connectors, multiple resistor stubs, multiple DIMMs, multiple arrays of memory devices, and multiple interface circuits, etc. Further, each buffer chips 154(a)-154(c) may be situated electrically between the memory controller 152 and corresponding memory devices 118, as shown.

It should also be noted that the system 150 may be constructed from components with various characteristics. In one embodiment, the system 150 may be constructed such that the traces 106(a)-106(c) may present an impedance (presented at point 157) of about 50 ohms to about 55 ohms. In one exemplary embodiment, the impedance of the traces 106(a)-106(c) may be 52.5 ohms.

In this case, for the data read/write channel, the resistive stubs 110(a)-110(c) may be configured to have a resistance of about 8 ohms to about 12 ohms. In one exemplary embodiment, the resistive stubs 110(a)-110(c) may have a resistance of 10 ohms. Additionally, the DIMMs 120 may have an impedance of about 35 ohms to about 45 ohms at a point of the traces 112(a)-112(c). In one exemplary embodiment, the DIMMs 120 may have an impedance of 40 ohms. In addition, the on-die termination resistors 156(a)-156(c) may be configured have a resistance of 20 Ohm, 20 Ohm, and off, respectively, if buffer chip 154(c) is the active memory device in the operation. In the prior art, for example, the resistive stubs 110(a)-110(c) may be configured as 15 Ohm and the DIMMs 120 are configured as 68 Ohm.

In this case, for the command/address channel, the resistive stubs 110(a)-110(c) may be configured to have a resistance of about 20 ohms to about 24 ohms. In one exemplary embodiment, the resistive stubs 110(a)-110(c) may have a resistance of 22 ohms. In this case, the impedance of traces 112(a)-112(c) may be about 81 ohms to about 99 ohms. In one exemplary embodiment, the impedance of the traces 112(a)-112(b) may be 90 ohms. In addition, the on-die termination resistors (input bus termination, IBT) 156(a)-156(c) may be configured have a resistance of 100 Ohm, 100 Ohm, 100 Ohm, respectively. In the prior art, for example, the resistive stubs 110(a)-110(c) are configured as 22 Ohm and the DIMMs 120 are configured as 68 Ohm. It should be noted, that all of the forgoing impedances are specific examples, and should not be construed as limiting in any manner. Such impedances may vary depending on the particular implementation and components used.

In order to realize a physical design with the characteristics as mentioned in the preceding paragraphs, several physical design techniques may be employed. For example, in order to achieve a desired impedance at a point of the traces 112(a)-112(b), a PCB manufacturing technique known as High Density Interconnect (HDI), and Build-Up technology may be employed.

HDI technology is a technique to condense integrated circuit packaging for increased microsystem density and high performance. HDI technology is sometimes used as a generic term to denote a range of technologies that may be added to normal PCB technology to increase the density of interconnect. HDI packaging minimizes the size and weight of the electronics while maximizing performance. HDI allows three-dimensional wafer-scale packaging of integrated circuits. In context of the present description the particular features of HDI technology that are used are the thin layers used as insulating material between conducting layers and micro-via holes that connect conducting layers and are drilled through the thin insulating layers.

One way of constructing the thin insulating layers is using build-up technology, although other methods may equally be employed. One way of creating micro-vias is to use a laser to drill a precision hole through thin build-up layers, although other methods may equally be employed. By using a laser to direct-write patterns of interconnect layouts and drill micro-via holes, individual chips may be connected to each other using standard semiconductor fabrication methods. The thin insulating layers and micro-vias provided by HDI technology allow precise control over the transmission line impedance of the PCB interconnect as well as the unwanted parasitic impedances of the PCB interconnect.

In another embodiment, a micro-via manufacturing technique may be utilized to achieve the desired impedance at a point of the traces 112(*a*)-112(*c*). Micro-via technology implements a via between layers of a PCB wherein the via traverses only between the specific two layers of the PCB, resulting in elimination of redundant open via stubs with conventional through-hole vias, a much lower parasitic capacitance, a much smaller impedance discontinuity and accordingly a much lower amplitude of reflections. In the context of the present description, a via refers to any pad or strip with a plated hole that connects tracks from one layer of a substrate (e.g. a PCB) to another layer or layers.

Additionally, in order to achieve better electrical signal performance, a PCB manufacturing technique known as flip-chip may be employed. Flip chip package technology implements signal connectivity between the package and a die that uses much less (and often a shortened run-length of) conductive material than other similarly purposed technologies employed for the stated connectivity such as wire bond, and therefore presents a much lower serial inductance, and accordingly a much lower impedance discontinuity and lower inductive crosstalk.

To further extend the read cycle signal integrity between the memory controller 152 and the memory devices 118, a programmable I/O driver may be employed. In this case, the driver may be capable of presenting a range of drive strengths (e.g. drive strengths 1–N, where N is an integer). Each of the drive strength settings normally corresponds to a different value of effective or average driver resistance or impedance, though other factors such as shape, effective resistance, etc. of the drive curve at different voltage levels may also be varied. Such a strength value may be programmed using a variety of well known techniques, including setting the strength of the programmable buffer as a response to a command originating or sent through the memory controller 152. Due to the nature of the multi-drop topology, the read path desires stronger driver strength than what memory devices on regular Register-DIMM can provide.

The components that contribute to the characteristics of the aforementioned channel are designed to provide an interconnection capable of conveying high-speed signal transitions. Table 1 shows specific memory cycles (namely, READ, WRITE, and CMD) illustrating the performance characteristics of a generic solution of the prior art, representative of commercial standards, versus an implementation of one embodiment discussed in the context of the present description. It should be noted that long valid data times (e.g. valid windows) supporting high frequency memory reads and writes are both highly valued, and elusive.

TABLE 1

|  | Generic Embodiments | | Presently Discussed Embodiments | |
| --- | --- | --- | --- | --- |
| Path | Impedance Matching | Valid Window | Impedance Matching | Valid Window |
| READ | ~70 ohm driving into 40 ohm in parallel with 40 ohm | 300 picoseconds | ~40 ohm driving into 40 ohm in parallel with 40 ohm | 700 picoseconds |
| WRITE | ~40 ohms driving into 80 in parallel with 40 | 280 picoseconds | ~40 ohm driving into 50 ohm in parallel with 40 ohm | 580 picoseconds |
| CMD |  | 630 picoseconds |  | 1 nanosecond |

As shown in Table 1, impedance matching of the presently discussed embodiments are nearly symmetric. This is in stark contrast to the extreme asymmetric nature of the prior art. In the context of the present description, impedance matching refers to configuring the impedances of different transmission line segments in a channel so that the impedance variation along the channel remains minimal. There are challenges for achieving good impedance match on both read and write directions for a multi-drop channel topology. Additionally, not only the differences in symmetry between the READ and WRITE paths that are evident, but also the related characteristics as depicted in FIGS. 2-4 discussed below.

Figure 2A:
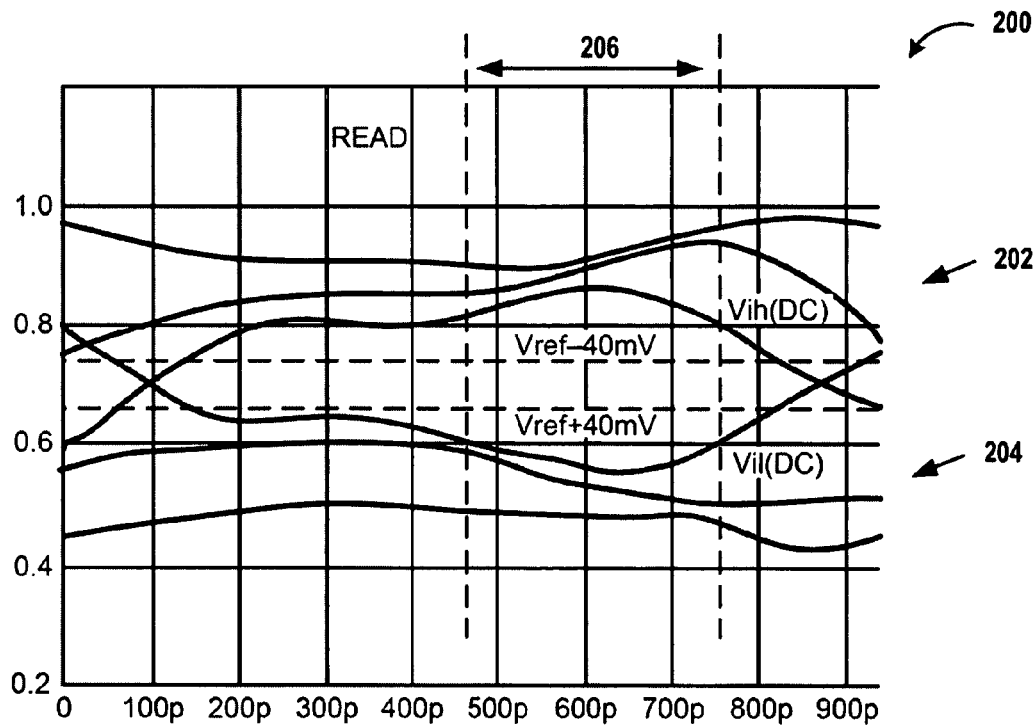
FIG. 2A shows an eye diagram of a data read cycle associated with the prior art.
Figure 2B:
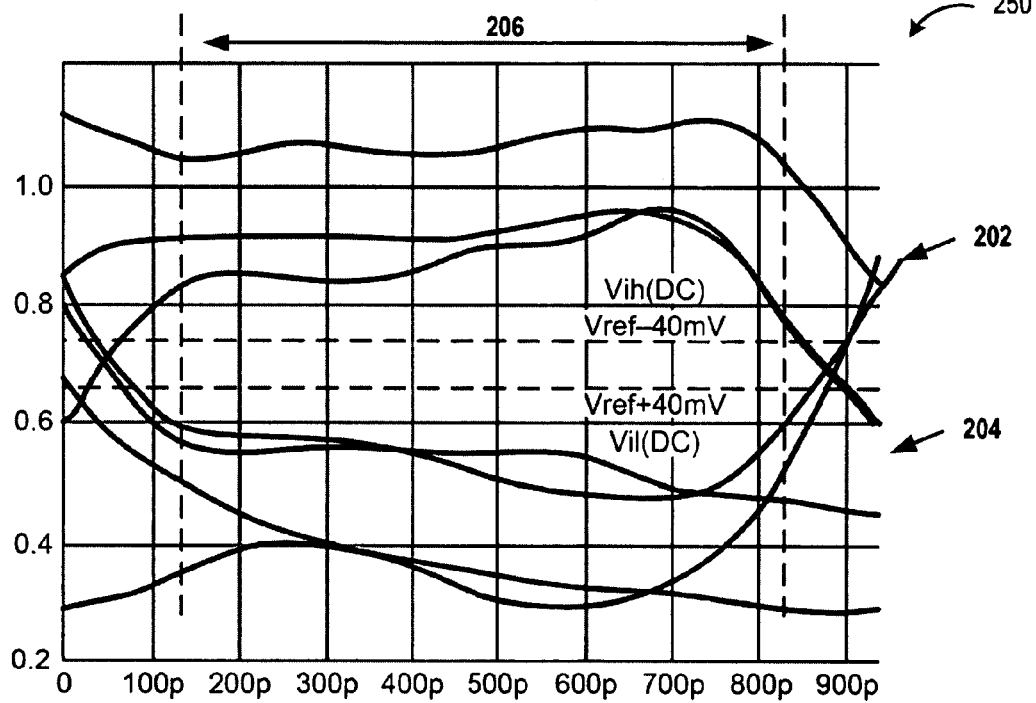
FIG. 2B shows an eye diagram of a data read cycle, in accordance with one embodiment.

FIGS. 2A and 2B depict eye diagrams 200 and 250 for a data READ cycle for double-data-rate three (DDR3) dual rank synchronous dynamic random access memory (SDRAM) at a speed of 1067 Mbps. FIG. 2A substantially illustrates the data shown for the generic READ memory cycle associated with the prior art. In particular, FIG. 2A shows a time that an eye is almost closed.

More specifically the time that high signals 202 is above the high DC input threshold Vih(DC) voltage and the time that the low signals 204 are below the lower DC input threshold Vil(DC) voltage defines a valid window 206 (i.e. the eye). As can be seen by inspection, the valid window 206 of FIG. 2A is only about 300 picoseconds, while the valid window 206 of an implementation of the presently discussed embodiments is about 700 picoseconds, as shown in FIG. 2B, which is more than twice as long as the prior art.

In similar fashion, FIGS. 3A and 3B depict eye diagrams 300 and 350 for a data WRITE cycle. Inspection of FIG. 3A illustrates data for the WRITE cycle associated with the prior art. More specifically, the time that high signals 302 are above the Vih(AC) voltage and the time that low signals 304 are below the Vil(DC) voltage defines a valid window 306. As can be seen by inspection, the valid window of FIG. 3A is only about 350 picoseconds, while the valid window 306 of an implementation of the presently discussed embodiments is about 610 picoseconds, as shown in FIG. 3B.

Figure 4A:
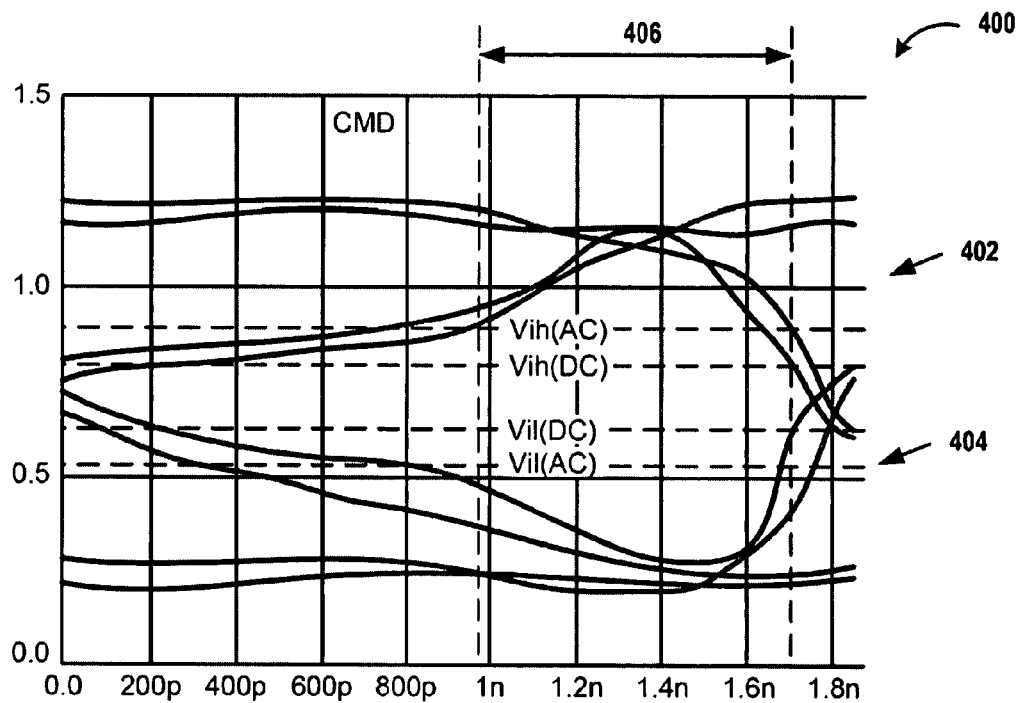
FIG. 4A shows an eye diagram of a command/address (CMD/ADDR) cycle associated with the prior art.
Figure 4B:
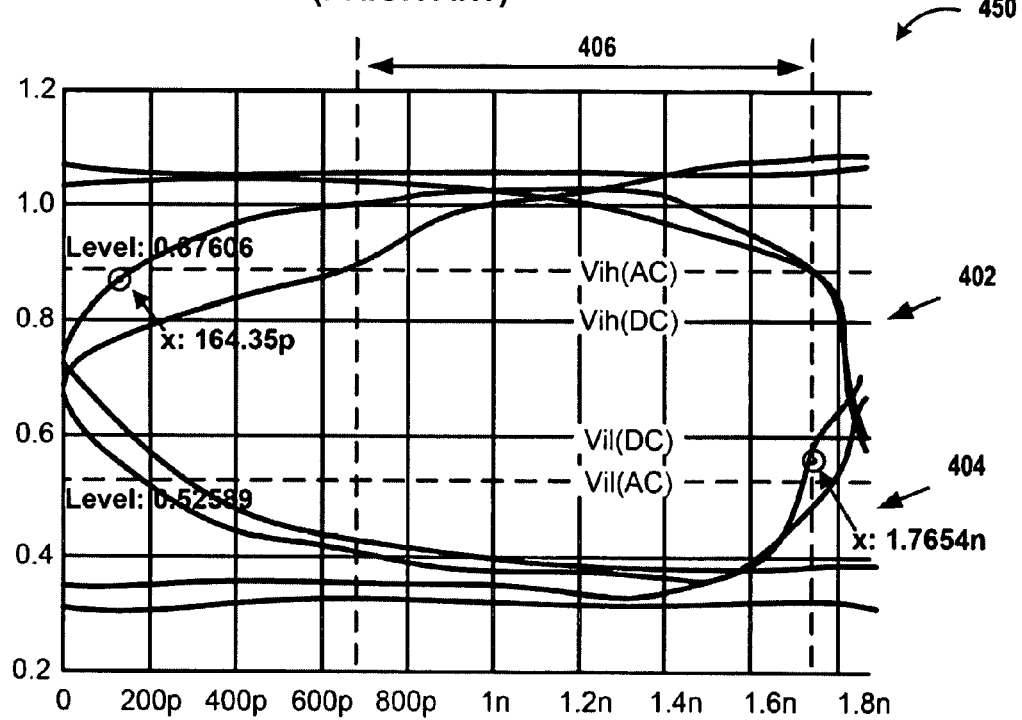
FIG. 4B shows an eye diagram of a CMD/ADDR cycle, in accordance with one embodiment.

FIGS. 4A and 4B depict eye diagrams 400 and 450 for a CMD cycle. Inspection of FIG. 4A illustrates data for the CMD cycle associated with the prior art. More specifically a time that high signals 402 is above the Vih(AC) voltage and a time that low signals 404 are below the Vil(DC) voltage defines the valid window 406. As can be seen by inspection, the valid window 406 of FIG. 4A is only about 700 picoseconds, while the valid window 406 of the presently discussed embodiments as shown in FIG. 4B is about 1.05 nanoseconds.

Figure 5A:
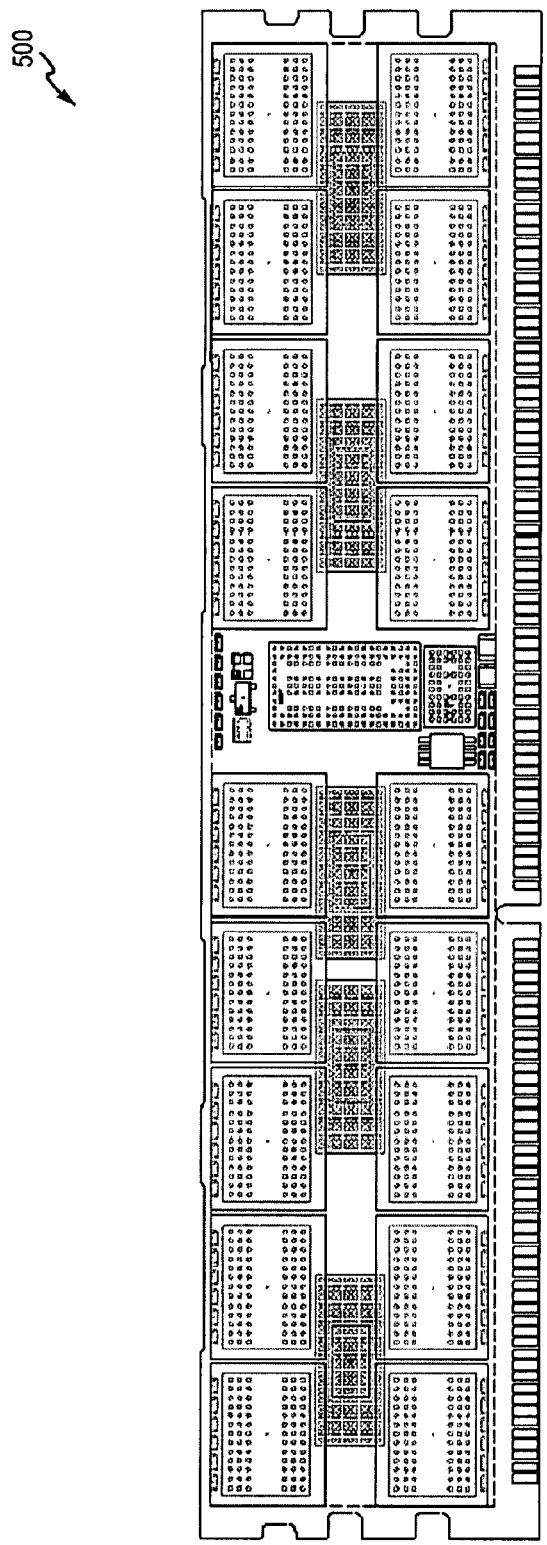
FIGS. 5A and 5B depict a memory module (e.g. a DIMM) and a corresponding buffer chip, in accordance with one embodiment.
Figure 5B:
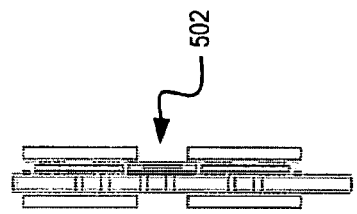

FIGS. 5A and 5B depict a memory module (e.g. a DIMM) 500 and a corresponding buffer chip 502 which may be utilized in the context of the details of the FIGS. 1-4. For example, the memory module 500 and the buffer chip 502 may be utilized in the context of the DIMMs 120 of FIGS. 1B and 1C.

Figure 6:
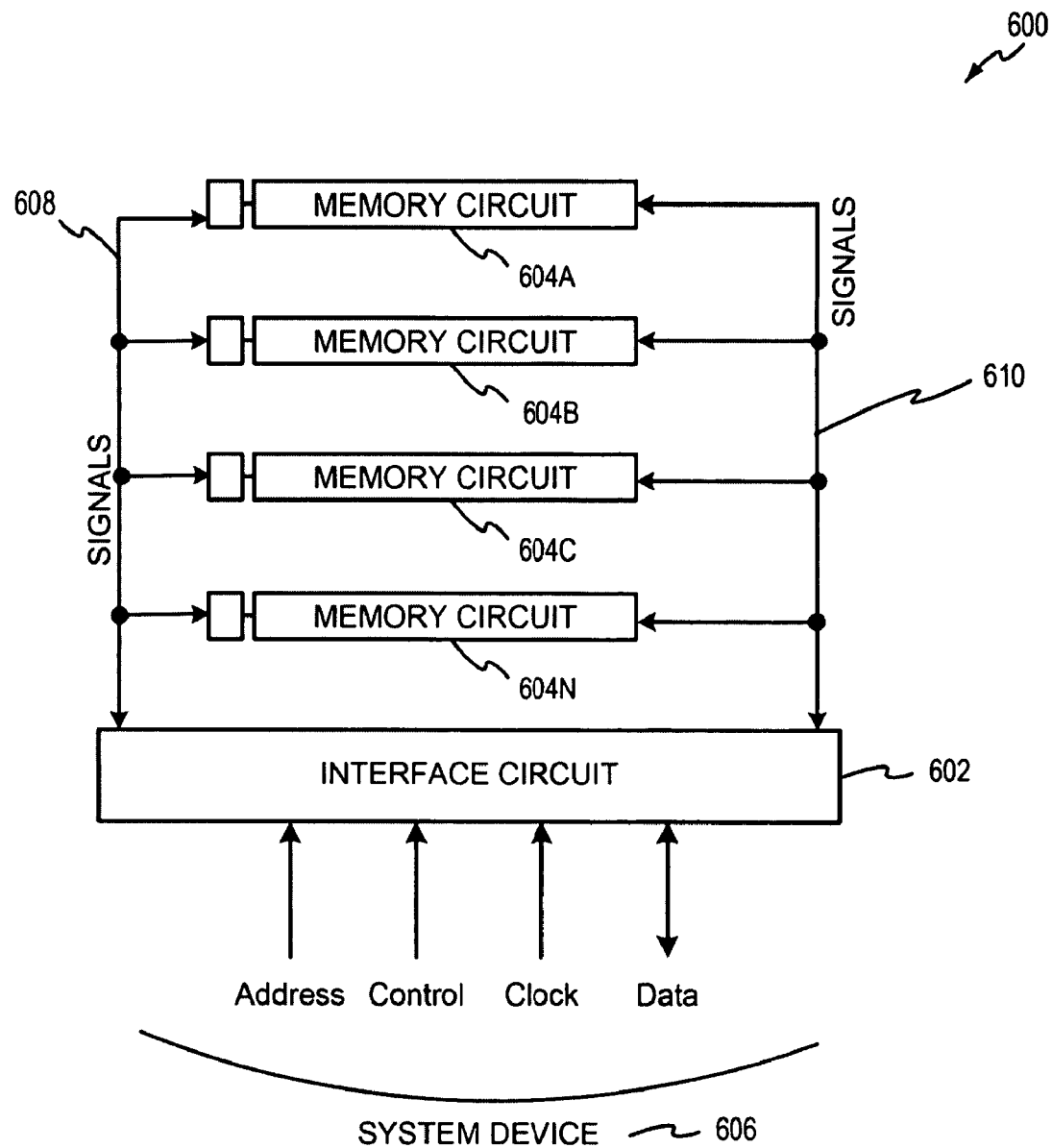
FIG. 6 shows a system including a system device coupled to an interface circuit and a plurality of memory circuits, in accordance with one embodiment.

FIG. 6 shows a system 600 including a system device 606 coupled to an interface circuit 602 and a plurality of memory circuits 604A-604N, in accordance with one embodiment. Although the interface circuit 602 is illustrated as an individual circuit, the interface circuit may also be represented by a plurality of interface circuits, each corresponding to one of the plurality of memory circuits 604A-604N.

In one embodiment, and as exemplified in FIG. 6, the memory circuits 604A-604N may be symmetrical, such that each has the same capacity, type, speed, etc. Of course, in other embodiments, the memory circuits 604A-604N may be asymmetrical. For ease of illustration only, four such memory circuits 604A-604N are shown, but actual embodiments may use any number of memory circuits. As will be discussed below, the memory chips may optionally be coupled to a memory module (not shown), such as a DIMM.

The system device 606 may be any type of system capable of requesting and/or initiating a process that results in an access of the memory circuits. The system may include a memory controller (not shown) through which it accesses the memory circuits 604A-604N.

The interface circuit 602 may also include any circuit or logic capable of directly or indirectly communicating with the memory circuits, such as a memory controller, a buffer chip, advanced memory buffer (AMB) chip, etc. The interface circuit 602 interfaces a plurality of signals 608 between the system device 606 and the memory circuits 604A-604N. Such signals 608 may include, for example, data signals, address signals, control signals, clock signals, and so forth.

In some embodiments, all of the signals communicated between the system device 606 and the memory circuits 604A-604N may be communicated via the interface circuit 602. In other embodiments, some other signals 610 are communicated directly between the system device 606 (or some component thereof, such as a memory controller, or a register, etc.) and the memory circuits 604A-604N, without passing through the interface circuit 602.

As pertains to optimum channel design for a memory system, the presence of a buffer chip between the memory controller and the plurality of memory circuits 604A-604N may present a single smaller capacitive load on a channel as compared with multiple loads that would be presented by the plurality of memory devices in multiple rank DIMM systems, in absence of any buffer chip.

The presence of an interface circuit 602 may facilitate use of an input buffer design that has a lower input threshold requirement than normal memory chips. In other words, the interface circuit 602 is capable of receiving more noisy signals, or higher speed signals from the memory controller side than regular memory chips. Similarly, the presence of the interface circuit 602 may facilitate use of an output buffer design that is capable of not only driving with wider strength range, but also driving with wider range of edge rates, i.e., rise time. Faster edge rate may also facilitate the signal integrity of the data read path, given voltage margin is the main limiting factor. In addition, such an output buffer can be designed to operate more linearly than regular memory device output drivers.

Figure 7:
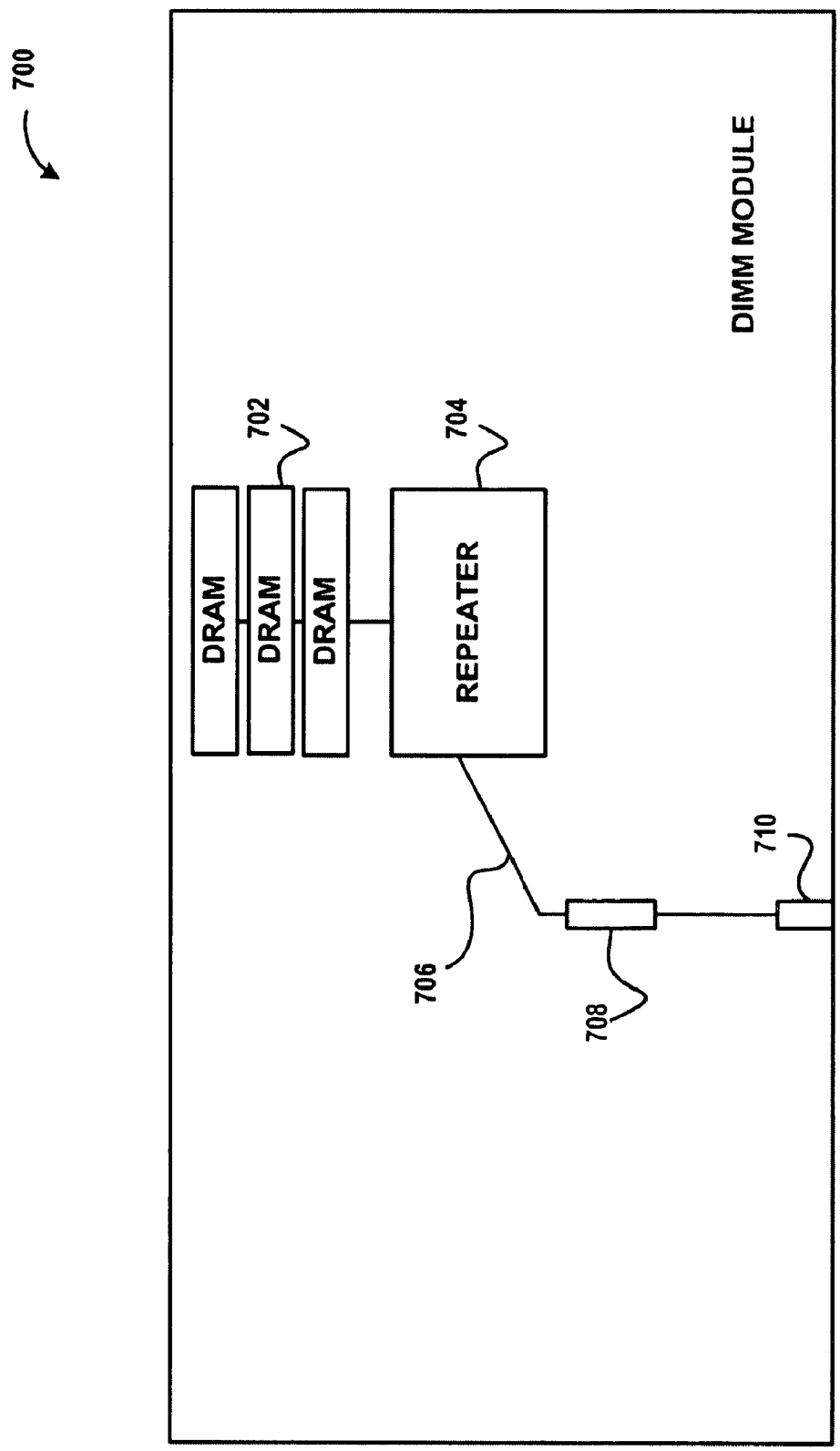
FIG. 7 shows a DIMM, in accordance with one embodiment.

FIG. 7 shows a DIMM 700, in accordance with one embodiment. As shown, the DIMM includes memory (e.g. DRAM) 702, a repeater chip 704 (e.g. an interface circuit), a DIMM PCB 706, a stub resister 708, and a connector finger 710. The repeater chip 704, the DIMM PCB 706, the stub resister 708, and the connector finger 710 may be configured, as described in the context of the details of the above embodiments, in order to provide a high-speed interface between the DRAM 702 and a memory controller (not shown).

Figure 8:
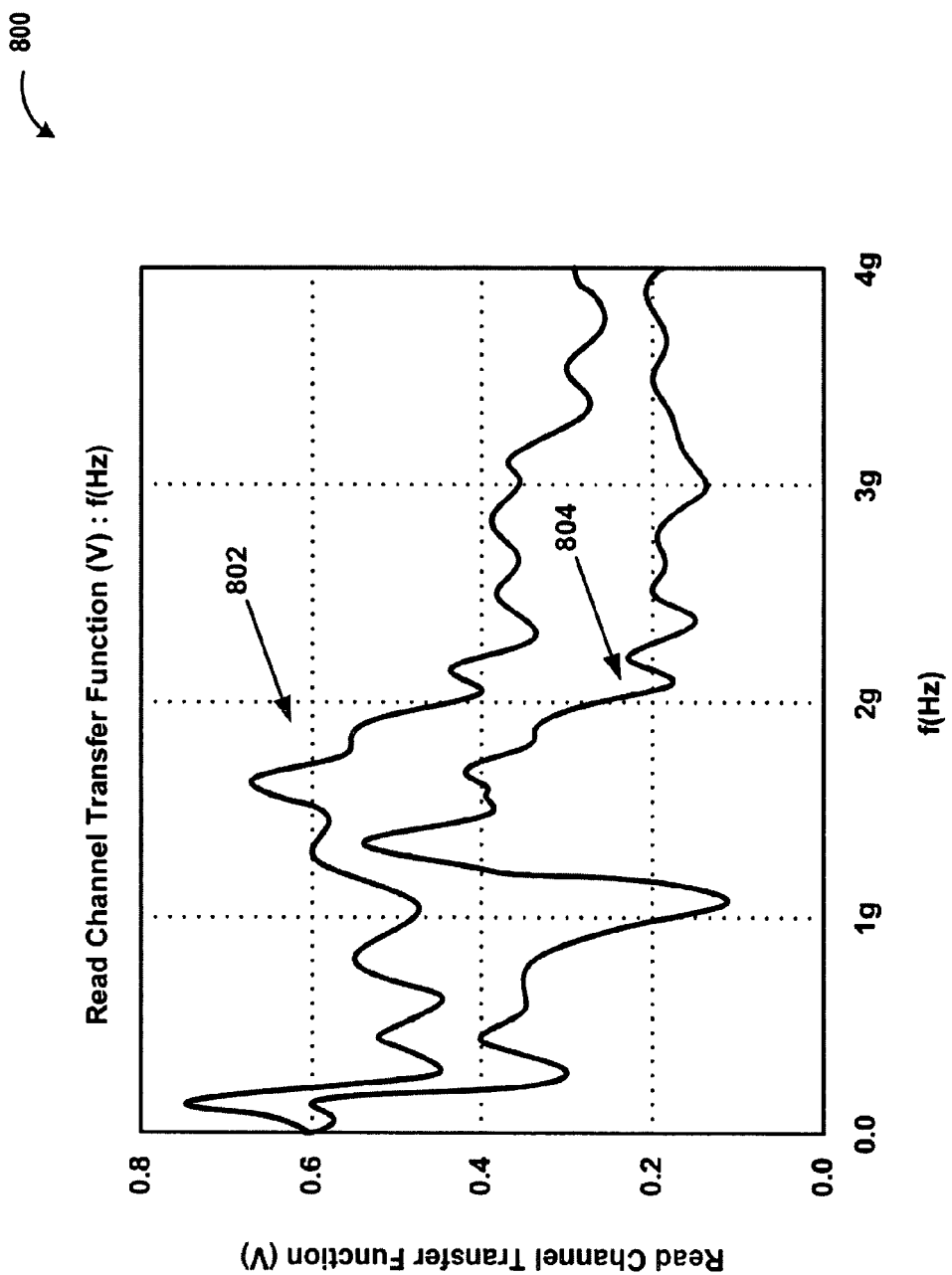
FIG. 8 shows a graph of a transfer function of a read channel, in accordance with one embodiment.

FIG. 8 shows a graph 800 of a transfer function of a read function, in accordance with one embodiment. As shown, a transfer function 802 for the optimized memory channel design indicates significant improvement of channel bandwidth compared to a transfer function 804 of the original channel design on a wide range of frequencies. In this case, the graph 800 represents an experiment with a DDR3, 3 DIMMs per channel topology, using a 1.4 volt power supply voltage on the stimulus source.

While various embodiments have been described above, it should be understood that they have been presented by way of example only, and not limitation. For example, although the foregoing embodiments have been described using a defined number of DIMMs, any number of DIMMs per channel (DPC) or operating frequency of similar memory technologies [Graphics DDR (GDDR), DDR, etc.] may be utilized. Thus, the breadth and scope of a preferred embodiment should not be limited by any of the above-described exemplary embodiments, but should be defined only in accordance with the following claims and their equivalents.

What is claimed is:

1. A system, comprising:
a plurality of memory devices; and
at least one channel configured to provide an electrical communication between a memory controller and a first memory device of the plurality of memory devices, the channel comprising:
a micro-via;
a circuit configured to provide impedance matching between the memory controller and the first memory device, the circuit including a first resistor;
a second resistor configured to couple with the memory controller; and
a transmission line having a first end and a second end, the first end of the transmission line coupled with the first resistor and the second end of the transmission line coupled with the second resistor.

2. The system of claim 1, wherein the channel is a data read/write channel.

3. The system of claim 2, wherein the first resistor has a resistance of 20 ohms.

4. The system of claim 2, wherein the second resistor has a resistance between 8 ohms and 12 ohms.

5. The system of claim 2, wherein the transmission line has an impedance between 35 ohms and 45 ohms.

6. The system of claim 1, wherein the channel is a command/address channel.

7. The system of claim 6, wherein the first resistor has a resistance of 100 ohms.

8. The system of claim 6, wherein the second resistor has a resistance between 20 ohms and 24 ohms.

9. The system of claim 6, wherein the transmission line has an impedance between 81 ohms and 99 ohms.

* * * * *

UNITED STATES PATENT AND TRADEMARK OFFICE
CERTIFICATE OF CORRECTION

| | | |
|---|---|---|
| PATENT NO. | : 8,111,566 B1 | Page 1 of 1 |
| APPLICATION NO. | : 11/941589 | |
| DATED | : February 7, 2012 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 186 days.

Signed and Sealed this
Nineteenth Day of June, 2012

David J. Kappos
*Director of the United States Patent and Trademark Office*